US007254945B1

(12) United States Patent
Sakai et al.

(10) Patent No.: US 7,254,945 B1
(45) Date of Patent: Aug. 14, 2007

(54) OPERATE CHECK VALVE AND HYDRAULIC DRIVING UNIT

(75) Inventors: Yoshitake Sakai, Toki (JP); Osamu Sato, Minokamo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 11/362,377

(22) Filed: Feb. 27, 2006

(51) Int. Cl.
*F15B 7/06* (2006.01)
*B64C 13/00* (2006.01)

(52) U.S. Cl. .......................................... 60/476; 91/420

(58) Field of Classification Search .................. 91/420, 91/436; 60/476
See application file for complete search history.

(56) References Cited

U.S. PATENT DOCUMENTS 2,657,533 A * 11/1953 Oster et al. .................... 60/476
2,716,995 A * 9/1955 Baugh et al. ................. 60/476
4,343,153 A * 8/1982 Kern et al. .................... 60/476
5,279,119 A * 1/1994 Shelhart et al. ............... 60/476
5,575,150 A * 11/1996 Vieten et al. .................. 60/476
RE36,342 E * 10/1999 McFadyen et al. ........... 91/420

FOREIGN PATENT DOCUMENTS

JP 02-255005 10/1990
JP 2824659 11/1998
JP 2003-172307 6/2003

* cited by examiner

*Primary Examiner*—Thomas E. Lazo
(74) *Attorney, Agent, or Firm*—Hiroe & Associates; Michael L. Crapenhoft

(57) ABSTRACT

An operate check valve saves space and performs multiple functions by absorbing and integrating a switching valve. A switching valve for controlling the flow of a hydraulic fluid in both normal and reverse directions is coaxially contained with a check valve in a space inside a valve containing housing between a hydraulic pump and a tank for storing the hydraulic fluid. Check valves are located opposite one another on either side of the switching valve, with the switching valve integrated into the operate check valve.

8 Claims, 11 Drawing Sheets

Fig. 4(a)
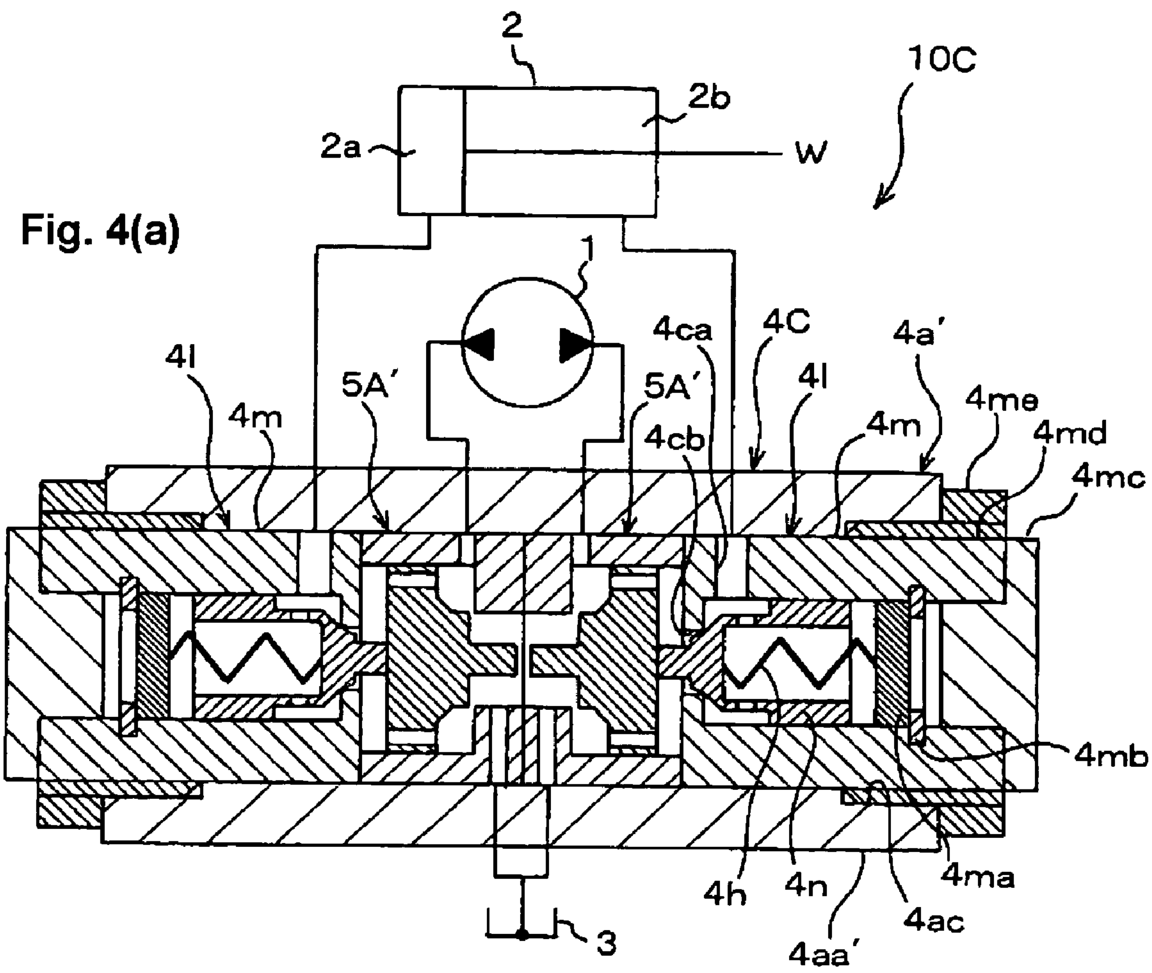
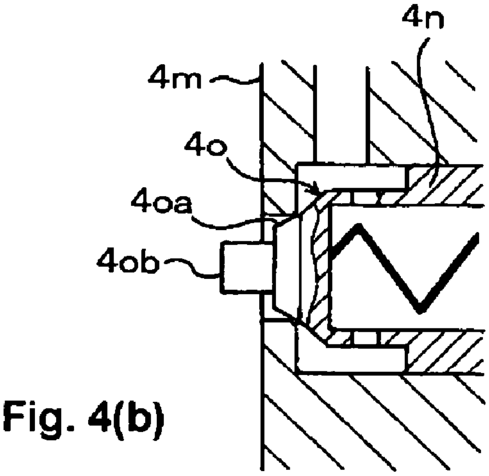
Fig. 4(b)

Fig. 5(a)
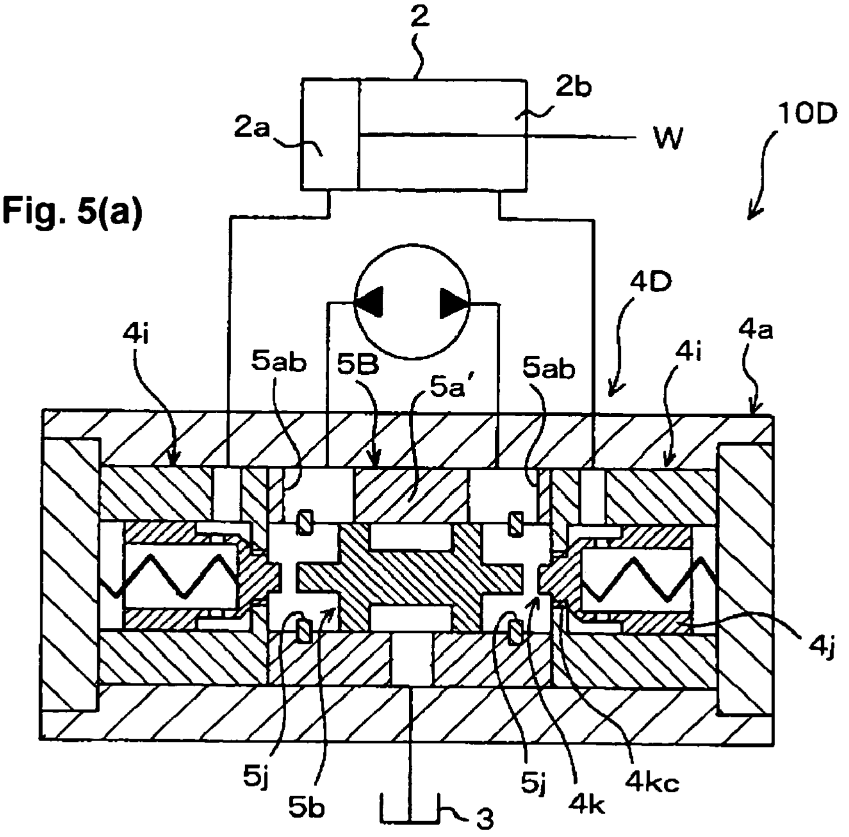
Fig. 5(b)
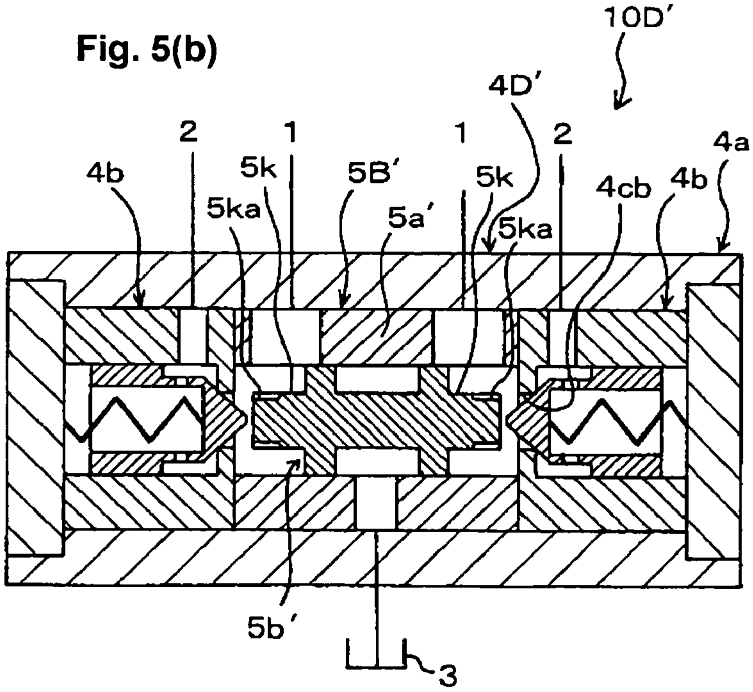
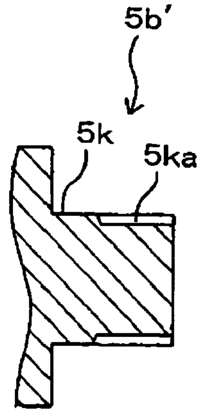
Fig. 5(c)

OPERATE CHECK VALVE AND HYDRAULIC DRIVING UNIT

BACKGROUND OF THE INVENTION

The invention relates to hydraulic systems, including hydraulic drive systems for operating hydraulically driven machinery and equipment. More specifically, the invention relates to an operate check valve that can be interposed between a hydraulic pump operable to pump hydraulic oil in both normal and reverse directions and a hydraulic actuator that is driven by this hydraulic oil. The invention relates further to a hydraulic driving unit that includes the hydraulic pump, the hydraulic actuator, the operate check valve and a tank for storing the hydraulic oil, in which the hydraulic driving unit generates and imparts a hydraulic driving force to a driven body.

Hydraulic drive units for generating a driving force through oil pressure have been used, for example, as lift mechanisms for operating work elements of agricultural and ground cultivating vehicles. Hydraulic drive units of this type are convenient in that they can serve as drive units for hydraulically-driven work elements without the need to lay extensive hydraulic pipe, needing only an electric power source to operate. Such units are expected to continue to be important and to see even wider application in the future.

Hydraulic drive units of this general type are described, for example, in Japanese Patent No. 2824659 and Japanese Patent Laid-Open No. 2003-172307.

SUMMARY OF THE INVENTION

An operate check valve according to the present invention is interposed between a hydraulic pump that pumps a hydraulic fluid in both normal and reverse directions and a hydraulic actuator that is operated by this hydraulic fluid. The check valve controls the flow of the hydraulic fluid in both the normal and reverse directions between the hydraulic pump and the hydraulic actuator.

A switching valve for controlling the flow of the hydraulic fluid both in the normal and reverse directions between the hydraulic pump and a tank for storing the hydraulic fluid is contained coaxially at the center of the valve in a valve containing portion, with check valves provided on either side of the switching valve.

The operate check valve according to the invention may find use in a variety of hydraulic drive assemblies.

The operate check valve of the present invention enables space saving and performs multiple functions since the switching valve is integrated with the operate check valve. Also, since the hydraulic driving unit of the present invention is provided with this operate check valve, the system performs its functions as a unit and size reduction can be realized in the system as a whole.

BRIEF DESCRIPTION OF THE DRAWINGS

The invention may be better understood by reference to the following detailed description, read in combination with the drawings that accompany it, in which:

FIG. 3(*b*) is a detailed view of a portion of the assembly shown in FIG. 3(*a*);

FIG. 3(*c*) is a sectional view on arrows AA in FIG. 3(*b*);

FIG. 4(*a*) is a conceptual diagram showing another example of a hydraulic driving unit provided with an operate check valve according to the invention FIG. 4(*b*) is a detailed view showing a portion of the check valve of FIG. 4(*a*);

FIGS. 5(*a*) and 5(*b*) are conceptual diagrams showing further examples of hydraulic driving units provided with operate check valves according to the present invention;

FIG. 5(*c*) is a detailed view of a part of a spool used in FIG. 5(*b*);

FIG. 7(*c*) is a detailed view of a part of the assembly shown in FIG. 7(*b*);

DETAILED DESCRIPTION OF THE PREFERRED EMBODIMENTS

Figure 10:
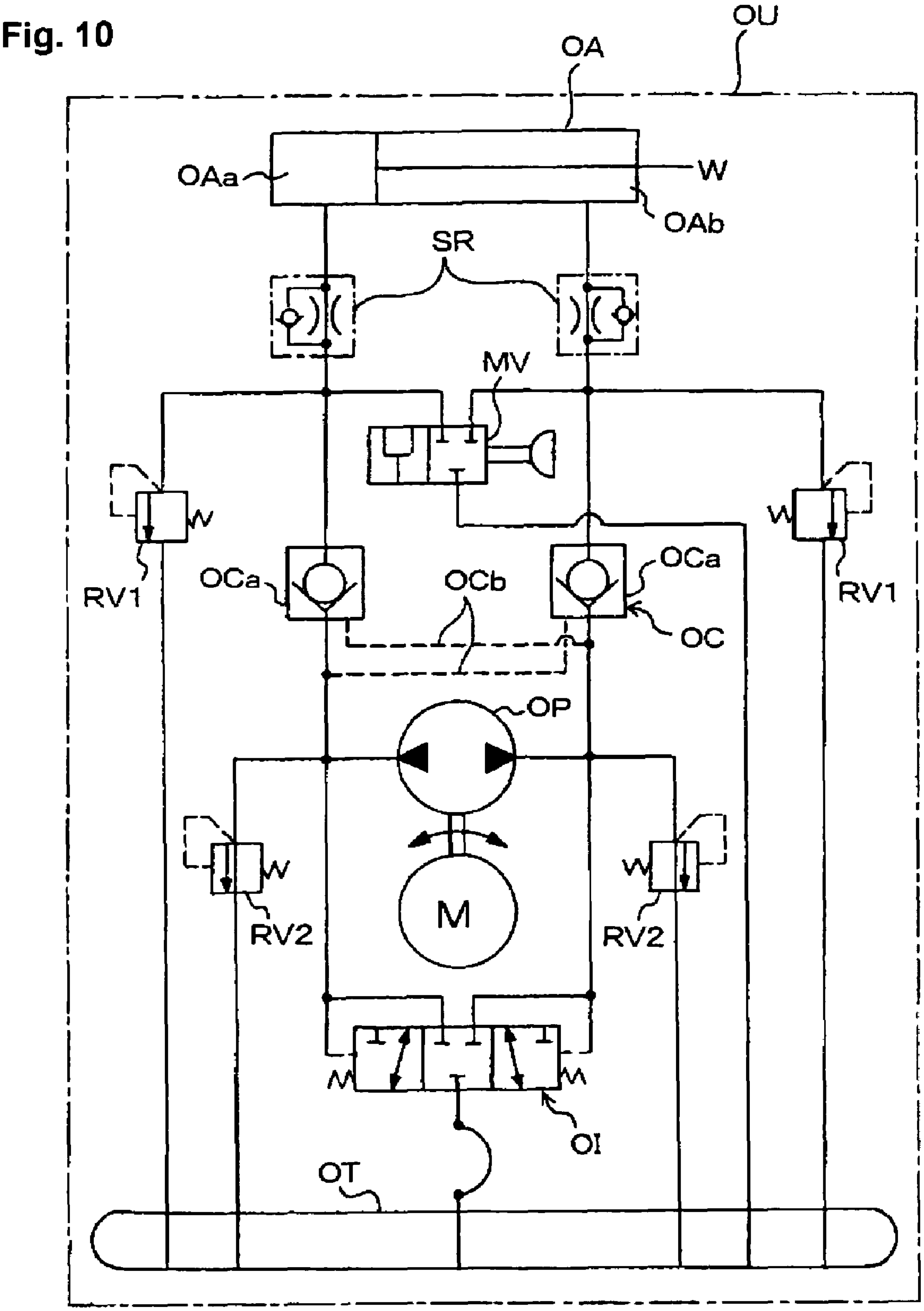
FIG. 10 is a hydraulic circuit diagram showing a basic construction of a hydraulic driving unit.

FIG. 10 is a hydraulic circuit diagram showing the basic construction of a hydraulic driving unit OU.

In order to deliver a driving force by hydraulic pressure to a driven body W independently, that is, while circulating hydraulic oil in a closed system, a hydraulic driving unit OU is provided with basic components that include a hydraulic pump OP that pumps the hydraulic oil in both normal and reverse directions by means of a normal/reverse rotating motor M, a hydraulic actuator OA (e.g., a hydraulic cylinder) driven by the hydraulic oil to generate the driving force, a tank OT for storing the hydraulic oil in a closed space, an operate check valve OC for controlling a flow of the hydraulic oil both in the normal and reverse directions between the hydraulic pump OP and the hydraulic actuator OA, and a switching valve OI for controlling the flow of the hydraulic oil both in the normal and reverse directions between the hydraulic pump OP and the tank OT.

The operate check valve OC is provided with a pair of check valves OCa that control the flow of the hydraulic oil between the hydraulic pump OP and the hydraulic actuator OA, and a pair of pilot lines OCb that pilot the hydraulic pressure between one of the check valves OCa and the other.

One of these check valves OCa is provided in a pipe line that connects one port of the hydraulic pump OP to a bottom-side oil chamber OAa of the hydraulic actuator OA, and the other in a pipe line that connects the other port of the hydraulic pump OP to a rod-side oil chamber OAb of the hydraulic actuator OA.

The switching valve OI selectively connects and disconnects the pipe lines between the tank OT and either of the pipe lines between the hydraulic pump OP and the bottom-side oil chamber OAa on one side of the hydraulic actuator OA, and the rod-side oil chamber OAb on the other.

In the following description, in some cases the left-side check valve OCa of the left and right pair in FIG. 10. is referred to as the bottom-side check valve in reference to the hydraulic oil going into and out of the bottom-side oil chamber OAa of the hydraulic actuator OA, and the other on the right is referred to as the rod-side in reference to the hydraulic oil going into and out of the rod-side oil chamber OAb. Similarly for the ports of the hydraulic pump OP, the left one may be called the bottom-side and the right one the rod-side in some cases.

In this example of the hydraulic drive unit OU, when the hydraulic pump OP is stationary, the outflow of hydraulic oil from both of the bottom-side oil chamber OAa and the rod-side oil chamber OAb of the hydraulic actuator OA is inhibited by the operate check valves OC, so that the hydraulic actuator OA is kept in its current stationary position against a preexisting external force.

When the hydraulic pump OP is driven so that hydraulic oil is discharged to the pump's bottom-side port, the hydraulic oil, passing through the bottom-side check valve OCa, is supplied from the hydraulic pump OP to the bottom-side oil chamber OAa. At the same time, the rod-side check valve OCa is pushed and opened by the hydraulic oil pressure in the bottom-side check valve OCa, piloted by the pilot line OCb. This allows the outflow of hydraulic oil from the rod-side oil chamber OAb to the hydraulic pump OP, and hence a flow of hydraulic oil circulating clockwise between the hydraulic pump OP and the hydraulic actuator OA is created so that a driving force is generated that extends the hydraulic actuator OA.

At this time, where the hydraulic actuator OA is a hydraulic cylinder as shown in the figure, the amount of hydraulic oil flowing out of the rod-side oil chamber OAb is reduced by the volume of the piston rod with respect to the amount of movement of the piston of the hydraulic cylinder as compared with the amount of hydraulic oil flowing into the bottom-side oil chamber OAa. The higher oil pressure in the bottom-side hydraulic oil, however, pushes and switches over the switching valve OI so that the pipe line between the rod-side oil chamber OAb and the tank OT is connected, thereby allowing hydraulic oil to flow from the tank to make up for this oil shortfall.

On the other hand, when the hydraulic pump OP is rotated so that hydraulic oil is discharged to the rod-side port, a circulating flow of hydraulic oil reverse to the above-described flow is created, and hence a driving force in the contracting direction is generated in the hydraulic actuator OA. Therefore, the hydraulic oil flowing from the bottom-side oil chamber OAa to the hydraulic pump OP is thus somewhat in excess of that required by the rod-side oil chamber OAb. Since the pipe line to the bottom-side oil chamber OAa and the tank OT are connected to each other, the excess hydraulic oil is then returned to the tank OT.

The amount of hydraulic oil in the enclosed tank OT increases or decreases depending on the position of the piston inside the hydraulic cylinder that is the hydraulic actuator OA, and hence the pressure of the gas sealed in the tank OT fluctuates. Where an adequate amount of sealed gas is provided, though, the operation of the hydraulic drive unit OU will not be affected by the fluctuations in gas pressure.

The proper functioning of the hydraulic drive unit OU is thus achieved and maintained though the hydraulic actuator OA in a closed system and one that compensates and allows for a difference in amount of hydraulic oil that goes in and out of the actuator.

This hydraulic driving unit OU is provided with the following additional components in addition to the basic components described above.

A slow return valve SR is provided in each of the pipe lines between the bottom-side oil chamber OAa and the rod-side oil chamber OAb of the hydraulic actuator OA and the respective check valve OCa of the operate check valve OC. These slow return valves SR throttle the flow of hydraulic oil from the respective oil chambers OAa and OAb to the check valve OCa.

The slow return valves SR prevent hunting that might otherwise occur when an external force is exerted on the actuator by a driven body W.

A pipe line provided with a relief valve RV1 branches to the tank OT from the pipe line between the slow return valve SR and the check valve OCa. Another pipe line provided with a relief valve RV2 branches to the tank OT from the pipe line between the hydraulic pump OP and the check valve OCa on each of the bottom side and the rod side.

These relief valves RV1 and RV2 let excess hydraulic oil escape to the oil tank OT when an abnormal pressure is produced in one of the main pipe lines.

Additional pipelines branch from the pipe lines between the slow return valves SR on the rod side and the bottom side and the check valves OCa. These lines are provided with an emergency manual valve MV which branches back to the tank OT. When the hydraulic pump OP is stopped by the absence of electric power, for example, the pipe lines of the bottom-side oil chamber OAa and the rod-side oil chamber OAb of the hydraulic actuator OA can be released to the oil tank OT so that the hydraulic actuator OA can be operated manually.

The hydraulic drive unit OU described here ensures safety, reliability, and accident avoidance to prevent damage to the drive unit OU while properly achieving the basic functions thereof even in the case of emergency.

Figure 11:
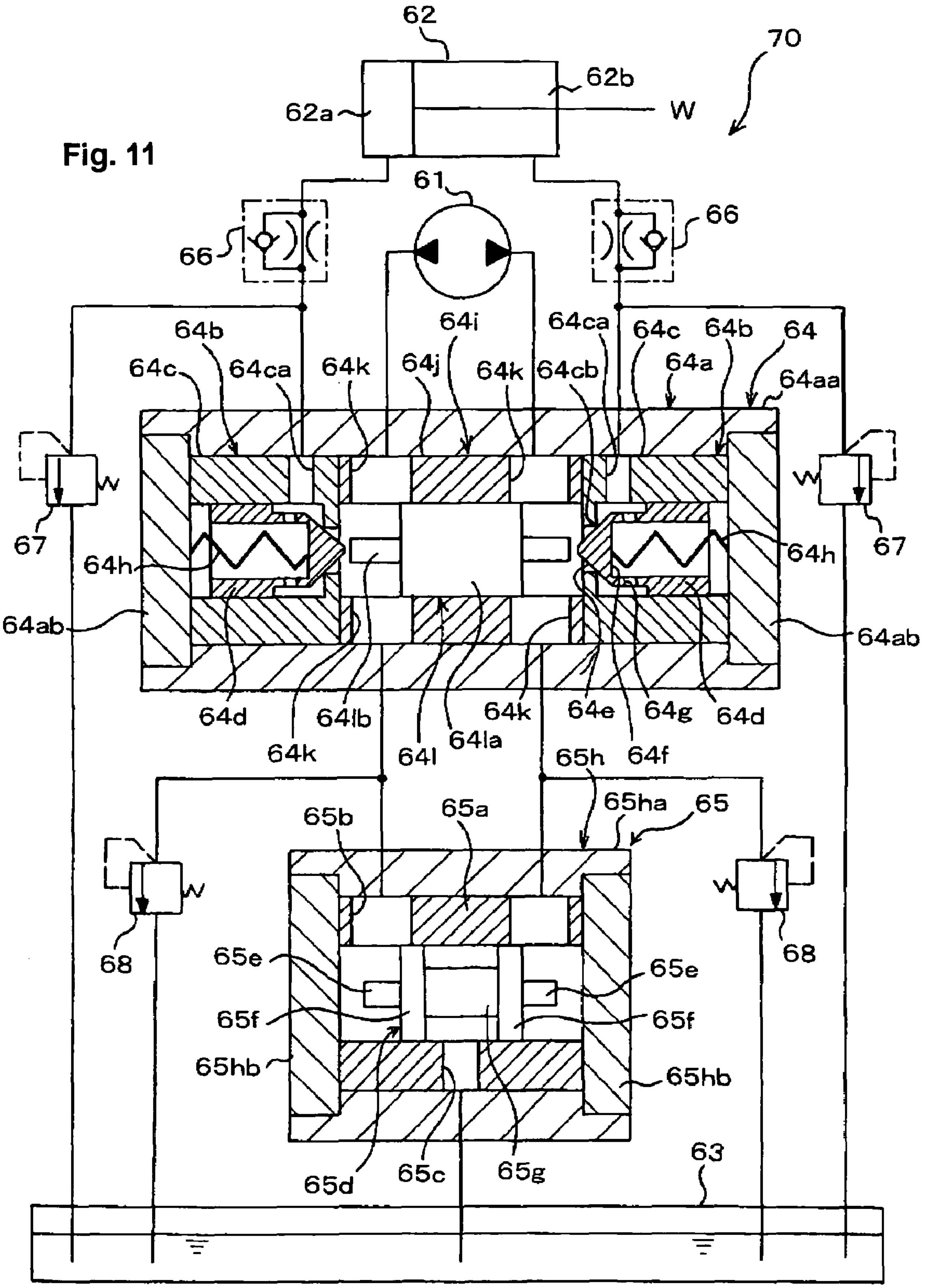
FIG. 11 is a conceptual diagram showing an example of a hydraulic driving unit provided with an operate check valve.

FIG. 11 is a block diagram that illustrates in more detail an example of a hydraulic driving unit of the type described above.

This hydraulic driving unit 70 includes a hydraulic pump 61, a hydraulic cylinder 62 as a hydraulic actuator, a tank 63, an operate check valve 64, a switching valve 65, slow return valves 66, and relief valves 67 and 68. These components have the same basic functions and mutual relationships as the hydraulic pump OP, the hydraulic actuator OA, the tank OT, the operate check valve OC, the switching valve OI, the slow return valves SR, and the relief valves RV1 and RV2 that comprise the hydraulic driving unit OU explained above in connection with FIG. 10.

Reference numeral 62*a* indicates a bottom-side oil chamber of the hydraulic cylinder 62; reference numeral 62*b* indicates the rod-side oil chamber. The emergency manual valve MV shown in the hydraulic circuit diagram in FIG. 10 is not shown in FIG. 11, but can be provided as necessary. An electric driving motor is also provided for driving the hydraulic pump OP, though also not shown in this figure.

The constructions of the operate check valve 64 and the switching valve 65 are described in more detail below.

The operate check valve 64 is provided with a valve containing portion 64*a*, a pilot portion 64*i* contained at the center part in this valve containing portion 64*a*, and a pair of check valves 64*b* contained opposing to each other and holding this pilot portion 64*i* between them.

The valve containing portion or housing 64*a* includes a cylindrical containing or housing cylinder 64*aa* and containing cylinder lids 64*ab* for closing both end openings in an oil-tight manner. A pilot portion 64*i* and a pair of check valves 64*b* are contained in the inside containing space of this containing cylinder 64*aa* in an oil-tight manner.

The pilot portion 64*i* is provided with a cylindrical spool cylinder 64*j*, which is housed at the center of the inside containing space of the containing cylinder 64*aa* without a gap between them. A pilot spool 64*l* is slidably housed in the inside columnar space of this spool cylinder 64*j*.

The spool cylinder 64*j* includes, on its cylinder portion, four openings 64*k*, which are connected through pipe lines to the two ports of the hydraulic pump 61 and to two openings 65*b* of the switching valve 65, thereby enabling communication of the hydraulic oil through these pipe lines between the hydraulic pump 61 and the switching valve 65.

The spool 64*l* has a structure that includes a small diameter pilot projection 64*lb* at the each end of a columnar body 64*la*. The columnar body of the spool has an outer diameter that renders it slidable inside the inner circumference of the spool cylinder 64*j*. The inside of the spool cylinder 64*j* is thus divided by the spool 64*l*, with an oil chamber on either side of the spool in communication with the openings 64*k*.

In this construction, while communication of the hydraulic oil is maintained at all times between the hydraulic pump 61 and the tank 63, when the hydraulic pump 61 is rotated, the oil pressure increases in the oil chamber connected to the discharge side, thus moving the pilot spool 64*l* to the non-discharge side.

Each of the pair of check valves 64*b* has the same form, with each of these valves including a valve seat body 64*c*, a valve body 64*d* that slides in the valve seat body 64*c*, and a spring 64*h* that works constantly to urges the valve body 64*d* in its valve-closing direction.

The valve seat body 64*c* is a cylindrical body with a relatively smaller opening as a valve seat hole 64*cb*. An opening 64*ca* is provided at a cylinder portion in the vicinity of the valve seat hole 64*cb* side to enable communication of hydraulic oil with the pipe lines to the rod-side oil chamber 62*b* of the hydraulic cylinder 62 and to the bottom-side oil chamber 62*a* on the opposite side.

The valve body 64*d* is a cylindrical body with a closed, conical tip end 64*e* on one side, and an open end on the other. A spring 64*h* is accommodated in the valve body's inner cylinder portion 64*f*, with the positions of the rear end of the spring 64*h* and the rear end of the valve seat body 64*c* limited by the containing cylinder lid 64*ab* of valve containing portion or housing 64*a*.

Another opening 64*g* is formed behind the tip portion 64*e* of the valve body 64*d*. This opening 64*g* allows communication between the opening 64*ca* and the valve body's inner cylinder portion 64*f*.

The switching valve 65 includes a valve containing portion or housing 65*h*, a cylindrical spool cylinder 65*a* that fits snugly inside the valve containing portion 65*h*, and a spool 65*d* that slides inside the inner columnar space of the spool cylinder 65*a*.

The valve containing portion 65*h* is comprised of a cylindrical containing cylinder or housing 65*ha* and containing cylinder lids 65*hb* that close both end openings of the containing cylinder 65*ha* in an oil tight manner. The spool cylinder 65*a* is also contained inside the inner containing space of this containing cylinder 65*ha* in an oil tight manner.

In the spool cylinder 65*a* are provided two openings 65*b* connected to two pipe lines from the operate check valve 64 for enabling communication of the hydraulic oil between these pipe lines and an opening 65*c* which does not interfere with these two openings 65*b* and enables communication of the hydraulic oil with the pipe line to the tank 63 at the position to the center of the spool cylinder 65*a* of both the openings 65*b* in the cylinder axial direction.

The spool 65*d* has a form in which two disks are pierced by a columnar body with an outer diameter smaller than the outer diameter of the disks. The outer diameter of the disk portions 65*f* allows the spool 65*d* to slide with respect to the inner circumference of the spool cylinder 65*a*.

The distance between the two disk portions 65*f* is selected, as shown, to block communication of the hydraulic oil between the above two openings 65*b* on the operate check valve 64 side and the opening 65*c* to the tank 63 side when the spool 65*d* is positioned at the center. When the spool 65*d* slides in one direction, to the bottom-side, for example, communication of the hydraulic oil is allowed only to the bottom side of the above two openings 65*b* on the operate check valve 64 side and to the opening 65*c* to the tank 63 side.

The outer diameter of a middle shaft portion 65*g* between the two disk portions 65*f* is large enough to maintain structural strength of the spool 65*d* as a whole, but small enough that the hydraulic oil can flow between the outer circumference and the inner circumference of the spool cylinder 65*a* without undue resistance.

The projecting length of an outer shaft portion 65*e* that projects outside of the disk portion 65*f* is such that, when its tip end is brought into contact with the containing cylinder lid 65*hb* on the bottom side, for example, of the valve containing portion 65*h*, communication of hydraulic oil is allowed only to the bottom side opening 65*b* on the operate check valve 64 side and the opening 65*c* to the tank 63 side is thereby maintained.

Each of the above portions constituting the spool 65*d* is fixed so that the entire spool slides integrally as a single body.

In this embodiment, in addition to the above function of the disk portion 65*f*, the spool 65*d* is moved to the non-discharge side to connect the suction side of the hydraulic pump 61 to the tank 63 when the higher pressure hydraulic oil at the discharge side of the hydraulic pump 61 is supplied to one of the outer shaft portions 65*e*. When the rotation of the hydraulic pump 61 is reversed and the discharge side and the suction side are inverted, the spool 65*d* acts oppositely to the above.

The operation of the operate check valve 64 and the switching valve 65 will now be described.

FIG. 11 shows the system in a stationary state, that is, a state in which the hydraulic pump 61 is not being rotated. In this state pressure is not applied to the hydraulic oil by the hydraulic pump 61, and the hydraulic oil contained between the hydraulic pump 61 and the internal oil chamber of the operate check valve 64 and the hydraulic oil contained in the oil chamber of both sides of the switching valve 65 and the central side oil chamber as well as the tank 63 are stationary.

The right and left check valves 64*b* of the operate check valve 64 are held closed by the urging forces of the springs 64*h*, and the hydraulic oil from both the bottom-side oil chamber 62*a* and the rod-side oil chamber 62*b* of the hydraulic cylinder 62 is closed by the check valve 64*b* so that the stationary state of the hydraulic cylinder 62 is maintained.

When the hydraulic pump 61 is rotated so as to discharge hydraulic oil to the bottom-side port, the oil's hydraulic pressure opens the check valve 64*b* on the bottom side so that hydraulic oil is supplied to the bottom-side oil chamber 62*a* of the hydraulic cylinder 62. The pilot spool 64*l* of the pilot portion 64*i* is moved to the right in FIG. 11, to the rod side, by this hydraulic pressure at the same time, and the outer shaft portion 64*lb* on the rod side opens the check valve 64*b* on the rod side to allow the flow of hydraulic oil from the rod-side oil chamber 62*b* of the hydraulic cylinder 62. The hydraulic oil thus drives and extends the hydraulic cylinder 62 in the rod-side direction.

At this time, the spool 65*d* of the switching valve 65 is also moved by this hydraulic pressure to the right in FIG. 11 to the rod side to allow communication of the hydraulic oil between the rod side of the hydraulic pump 61 and the tank 63, and in addition to the hydraulic oil from the rod-side oil chamber 62*b* of the hydraulic cylinder 62, the hydraulic oil from the tank 63 flows into the rod-side port of the hydraulic pump 61 so as to compensate for the shortage of the hydraulic oil amount of the rod-side oil chamber 62*b* with respect to the bottom-side oil chamber 62*a* of the hydraulic cylinder 62.

When the hydraulic pump 61 is rotated to discharge the hydraulic oil to the rod-side port, on the other hand, a reverse operation is generated at the check valve 64 and the switching valve 65. This drives the hydraulic cylinder 62 to contract so that an excess flow of hydraulic oil from the bottom-side oil chamber 62*a* with respect to the rod-side oil chamber 62*b* of the hydraulic cylinder 62 is returned to the tank 63.

In this way, the operate check valve 64 and the switching valve 65 perform their respective functions. Also, the pilot portion 64*i* of the operate check valve 64 plays the role of the pilot line OCb of the operate check valve OC provided in the hydraulic driving unit OU of FIG. 10.

However, in the above hydraulic driving unit 70, since the operate check valve 64 and the switching valve 65 are separately provided independently of each other, space is needed for both of them and pipe lines connecting them are also required, and further reductions in the size of such units is thus made difficult. This problem also occurs in systems in which the operate check valve and the switching valve are used in combination to control the flow of hydraulic oil in both normal and reverse directions, but not as part of a hydraulic driving unit.

Figure 1:
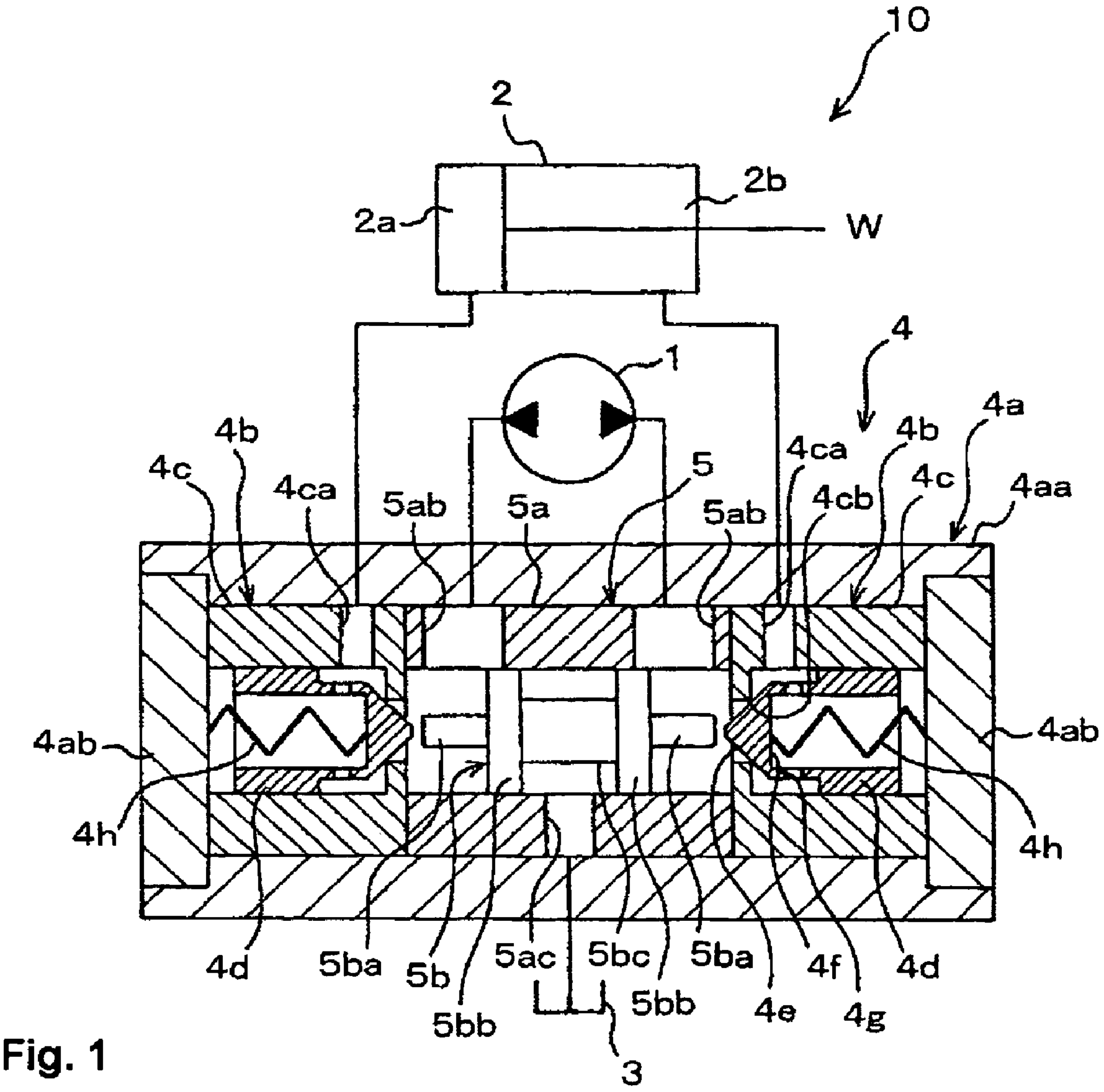
FIG. 1 is a conceptual diagram showing an example of a hydraulic driving unit that includes a check valve according to one embodiment of the invention.

FIG. 1 is a conceptual diagram showing an example of a hydraulic driving unit provided with an operate check valve according to one embodiment of the present invention.

This hydraulic driving unit 10 is used, for example, for lifting a working element of an agricultural vehicle with respect to cultivated ground. This application requires a simple and convenient hydraulic driving force, supplied independently of any source of power external to the vehicle. An operate check valve 4 is included in this hydraulic driving unit 10 in combination with a switching valve that controls the flow of hydraulic oil in both normal and reverse directions.

The assembly includes a hydraulic pump 1 with an electric motor (not shown) for pumping hydraulic oil in both the normal and the reverse directions. A hydraulic cylinder 2 functions as a hydraulic actuator, which is driven by the hydraulic oil to deliver a driving force to a driven body W. A tank 3 stores the hydraulic oil in a closed space, and an operate check valve 4 between the hydraulic pump 1 and the hydraulic cylinder 2 controls the flow of the hydraulic oil both in the normal and the reverse directions. The operate check valve 4 works with a switching valve 5 between the hydraulic pump 1 and the tank 3. The switching valve 5 controls the flow of the hydraulic oil in both the normal and reverse directions and is made a part of and integrated into the operate check valve 4.

The idea to incorporate and integrate this switching valve into the assembly of the operate check valve came about as the result of keen examination by the inventor and a finding that the pilot portion 64*i* in the operate check valve 64 in FIG. 11 and the switching valve 65 are operated in the same way in terms of control of the hydraulic oil in the normal and reverse flows, and the inventor's conclusion that the switching valve can be integrated into the pilot portion if a configuration is devised that enables performance of both the pilot function and the switching function at the same time, as is true of this embodiment and as will be described in more detail below.

The basic functions and mutual relations of the hydraulic pump 1, hydraulic cylinder 2, tank 3, operate check valve 4 and the switching valve 5 are the same as those of the hydraulic pump OP, hydraulic actuator OA, tank OT, operate check valve OC, and the switching valve OI that comprise the hydraulic driving unit OU in the example described above, and duplicate descriptions of those elements will thus be omitted. Reference symbol 2*a* of the hydraulic cylinder 2 refers to a bottom-side oil chamber, and symbol 2*b* refers to a rod-side oil chamber.

The slow return valve SR, relief valves RV1, RV2 and emergency manual valve MV shown in the hydraulic circuit diagram in FIG. 10 are not shown here, but they can be provided as necessary.

The operate check valve 4 includes a valve containing portion 4*a*, a switching valve 5, which is located at the center of the valve containing portion 4*a*, and a pair of check valves 4*b* disposed opposite one another with the switching valve 5 between them.

The valve containing portion 4*a* includes, in this example, a cylindrical containing cylinder 4*aa* and a pair of containing cylinder lids 4*ab* that close both-end openings of the containing cylinder 4*aa* in an oil tight manner.

The valve containing portion 4*a* is illustrated here as a separate and independent cylindrical part to facilitate explanation, but in an actual hydraulic driving unit, the valve containing portion may be incorporated into a structural body as a part of the structure of the entire unit, with an internal containing space of the valve containing portion 4*a* formed inside. When the operate check valve 4 is constructed as a single and separate part, it is advantageous to use this kind of valve containing portion 4*a*.

The switching valve 5 and a pair of check valves 4*b* are sealed in an oil tight manner inside the internal containing space of the containing cylinder 4*aa* of this valve containing portion 4*a*.

The switching valve 5 includes a cylindrical spool cylinder 5*a*, which is fitted snuggly into the center of the internal containing space of the containing cylinder 4*aa*, and a spool 5*b*, which is slideable inside the internal columnar space of the spool cylinder 5*a*.

The spool cylinder 5*a* is provided with two openings 5*ab* at its cylinder portion. These openings 5*ab* are connected to two pipe lines from the hydraulic pump 1 to enable communication of hydraulic oil between these pipe lines and an opening 5*ac* at a position away from the two openings 5*ab* and at the center of the spool cylinder 5*a*. This places both of the openings 5*ab* into potential communication with the pipe line to the tank 3.

The spool 5*b* is in the form of two disks that are pierced by a columnar body with an outer diameter smaller than the outer diameter of the disks. The outer diameter of the disk portions **5*bb* allows the spool 5*b* to slide inside the inner circumference of the spool cylinder 5*a***.

The distance between these two disk portions **5*bb* is, as shown in FIG. 1, such that communication of the hydraulic oil between the upper two openings 5*ab* on the hydraulic pump 1 side and the lower opening 5*ac* on the tank 3 side is prevented when the spool 5*b* is positioned at the center. If the spool 5*b* slides to one side of the assembly—to the bottom-side, for example—communication of the hydraulic oil is permitted only between the bottom side opening 5*ab* on the hydraulic pump 1 side and the opening 5*ac* to the tank 3** side.

The outer diameter of the intermediate shaft portion **5*bc* between the two disk portions 5*bb* of the columnar body is large enough to maintain the structural strength of the entire spool 5*b*, but small enough to allow communication of the hydraulic oil between the outer circumference and the inner circumference of the spool cylinder 5*a*** without undue resistance.

The projecting length of an outer shaft portion **5*ba* that projects outside of the disk portion 5*bb* is selected so as to fully open the opposing check valve 4*b* when the spool 5*b* is moved to its maximum extent, and the outer diameter is such that it passes through a valve seat hole 4*cb* of the check valve 4*b* with sufficient clearance to easily allow communication of the hydraulic oil between it and the valve seat hole 4*cb***.

The parts described above as constituting the spool **5*b*** are mutually fixed so the entire spool slides integrally as a single body.

In this embodiment, in addition to the above functions of the disk portion **5*bb*, when one of the outer shaft portions 5*ba* opens the check valve 4*b* on its side, the spool 5*b* allows communication of the hydraulic oil between the check valve 4*b* on this side, and the hydraulic pump 1 and the tank 3**.

Each of an identical pair of check valves **4*b* includes a valve seat body 4*c*, a valve body 4*d* that slides within this valve seat body 4*c*, and a spring 4*h* that urges the valve body 4*d*** in a direction that tends to close the valve.

The valve seat body **4*c* is a cylindrical body with one smaller opening valve seat hole 4*cb* side. The cylinder portion in the vicinity of the valve seat hole 4*cb* is provided with an opening 4*ca* that enables communication of the hydraulic oil to the pipe line to the rod-side oil chamber 2*b* of the hydraulic cylinder 2 on one side, and to the bottom-side oil chamber 2*a*** on the opposite side of the assembly.

The valve body **4*d* is a cylindrical body with a closed tip that serves as a conical valve portion 4*e* at one end, and an opening at the other. The spring 4*h* extends through this opening into the valve body's inner cylinder portion 4*f*, with the rear end of this spring 4*h* and the rear end of the valve seat body 4*c* held in place by the containing cylinder lid 4*ab* of the valve containing portion 4*a***.

The valve seat hole **4*cb* of the valve seat body 4*c* is closed by the valve portion 4*e* of the valve body 4*d* urged by the spring 4*h***.

An opening **4*g* is formed just behind the conical valve portion 4*e* of the valve body 4*d*. The opening 4*g* allows for communication of the hydraulic oil between the opening 4*ca* and the inner cylinder portion 4*f***.

As will be described in more detail below, this embodiment is one in which the operate check valve 4 provides both the check valve function and the switching valve function, in contrast to the multiple valve embodiments described above in connection with FIGS. 10 and 11.

FIG. 1 illustrates the system in a stationary state, that is, a state in which the hydraulic pump 1 is not moving. In this state, pressure is not applied to the hydraulic oil by the hydraulic pump 1, and the hydraulic oil is stationary.

The right and left check valves **4*b* of the operate check valve 4 are held closed by the urging force of the springs 4*h*. The hydraulic oil from both the bottom-side oil chamber 2*a* and the rod-side oil chamber 2*b* of the hydraulic cylinder 2 is held in place by the closed check valves 4*b* so as to maintain the stationary state of the hydraulic cylinder 2**.

When the hydraulic pump 1 is rotated to discharge hydraulic oil to the bottom-side port, the resulting oil pressure opens the check valve **4*b* on the bottom side of the system and hydraulic oil is thereby supplied to the bottom-side oil chamber 2*a* of the hydraulic cylinder 2**.

At the same time, the spool **5*b* of the switching valve 5 is moved by the oil pressure toward the right side of FIG. 1 (toward the rod side of the system). This allows communication of the hydraulic oil between the rod-side port of the hydraulic pump 1 and the tank 3. The same motion of the switching valve 5 moves the outer shaft portion 5*ba* on the rod side of the spool 5*b* to open the check valve 4*b* on the system's rod side to allow the flow of hydraulic oil from the rod-side oil chamber 2*b* of the hydraulic cylinder 2, and a driving force is generated to drive the hydraulic cylinder 2** in its extending direction.

The movement of the spool **5*b* and the opening of the rod-side check valve 4*b* also allow communication of hydraulic oil between the rod-side oil chamber 2*b* of the hydraulic cylinder 2 and the tank 3. Hydraulic oil from the tank 3 flows into the rod-side port of the hydraulic pump 1 to compensate for the shortage in the flow rate of hydraulic oil out of the rod-side oil chamber 2*b* of the hydraulic cylinder 2, in comparison with the flow rate of hydraulic oil into the bottom-side oil chamber 2*a* of the hydraulic cylinder 2**, this shortage again being due to the presence of the rod inside the cylinder's rod-side oil chamber.

When the hydraulic pump 1 is rotated to discharge hydraulic oil to the rod-side port, on the other hand, reverse operations are generated in the switching valve 4 and the check valve **4*b*, a driving force is generated in the hydraulic cylinder 2 in the contracting direction, and the excess of the hydraulic oil flow rate of the bottom-side oil chamber 2*a* with respect to the rod-side oil chamber 2*b* of the hydraulic cylinder 2 is returned to the tank 3**.

In this way, the mutual actions of the central switching valve 5 contained in the operate check valve 4 and the pair of opposing check valves **4*b* on either side of the switching valve 5** serve the function of the conventional operate check valve while the function of the switching valve is also performed.

In other words, the operate check valve 4 in this embodiment performs the functions of and integrates the switching valve in the system as previously described. The operate check valve thus performs multiple functions, which eliminates the need for a separate switching valve and a pipe line to connect the switching valve and the check valve. The required space and costs for providing these functions is thus reduced. A hydraulic driving unit 10 provided with an operate check valve of this type can also benefit from these same reductions in size and cost, while still maintaining all of the functions of the prior embodiments.

Further preferred embodiments will be described below. These additional embodiments include integrations of the switching valve and the operate check valve as described above in connection with FIG. 1, formation of the switching valve into a poppet, absorption and integration of a fixed or a variable slow return, and absorption and integration of a relief valve.

Figure 2A:
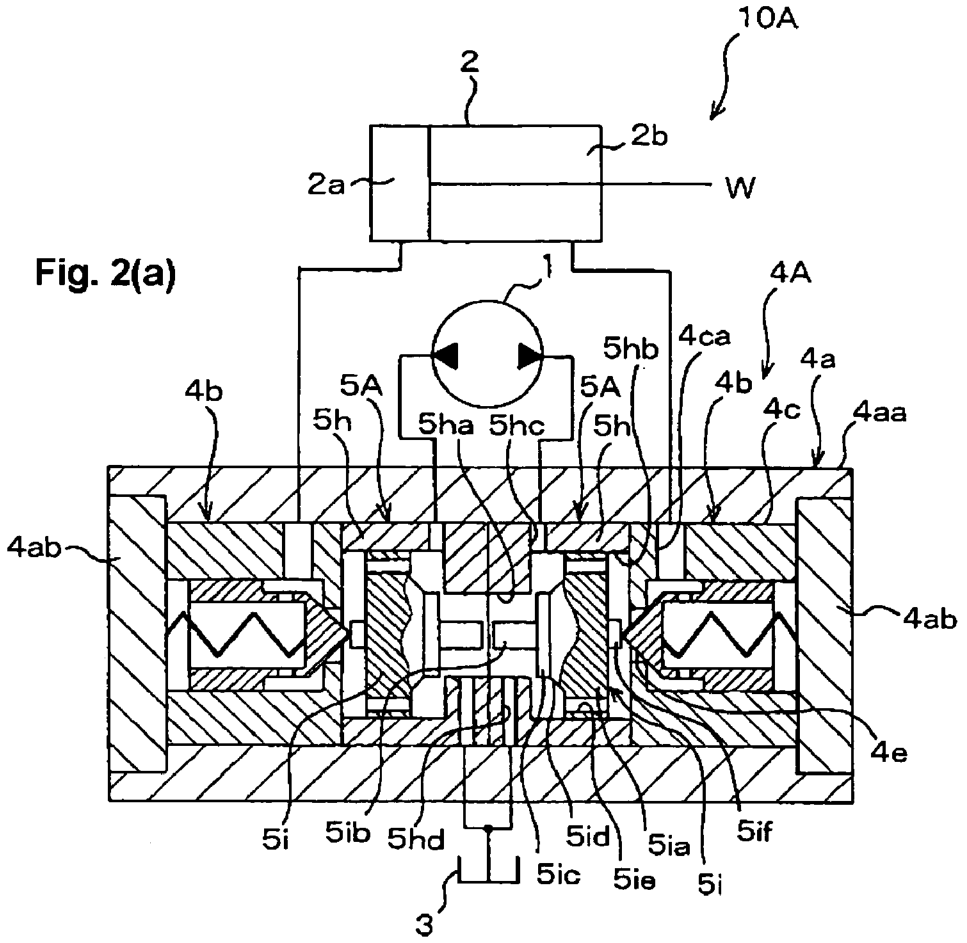
FIGS. 2(*a*) and 2(*b*) are conceptual diagrams showing another example of a hydraulic driving unit provided with an operate check valve according to the invention.
Figure 2B:
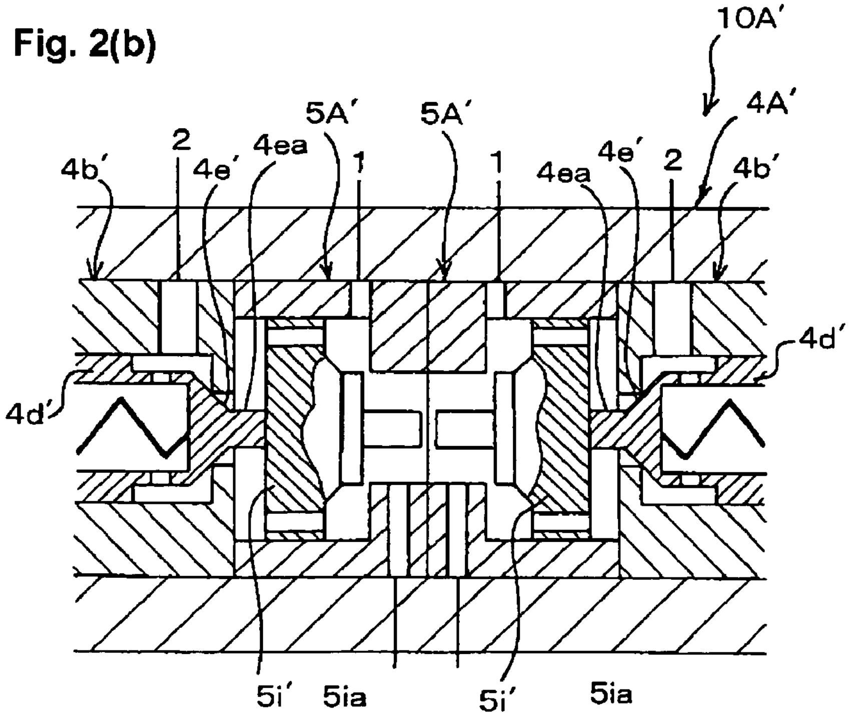

FIGS. 2A and 2B are conceptual diagrams illustrating another embodiment of a hydraulic driving unit provided with an operate check valve according to the invention. The same reference numerals are assigned to the portions that are the same as those mentioned previously, in order to omit duplicated explanation. Also, when a collective body of the parts has a separate reference numeral, only the numeral of the collective body may be shown to avoid unhelpful complexity.

The hydraulic driving unit 10A in FIG. 2(*a*) is different from the hydraulic driving unit 10 in FIG. 1, in that a switching valve 5A contained in an operate check valve 4A is of the poppet type. The check valve 4*b* is the same as that contained in the operate check valve 4 of the hydraulic driving unit 10, but the switching valve 5A, which is different, will be described in more detail below.

The switching valves 5A are located inside the central portion of the containing cylinder 4*aa* of the operate check valve 4A. The switching valves 5A are a mutually opposed pair of identical construction. Each of them includes a valve seat cylinder 5*h*, and a valve body 5*i* that slides within the valve seat cylinder 5*h*.

The valve seat cylinder 5*h* is a cylindrical body with a step on its inner circumference. The outer circumference of the valve seat cylinder 5*h* is fitted snugly and securely within the inner circumference of the containing cylinder 4*aa*. The inner circumference includes a small-diameter portion 5*ha* and a large-diameter portion 5*hb*. The small-diameter portion 5*ha* of one switching valve 5A abuts the small-diameter portion 5*ha* of the other. An opening 5*hc* is provided on the circumferential wall of the large-diameter portion 5*hb* closest to the small-diameter portion 5*ha* to enable communication of hydraulic oil to the pipe line to the hydraulic pump 1. A further opening 5*hd* is provided on the circumferential wall of the small-diameter portion 5*ha*, to allow communication of the hydraulic oil to the pipe line to the tank 3.

The valve body 5*i* is in the shape of a disk with a projection with one step on one side of the disk, and a projection without a step on the other side of the disk. The outer diameter of the disk portion 5*ia* allows it to slide with respect to the inner circumference of the large-diameter portion 5*hb* of the valve seat cylinder 5*h*.

The stepped projection includes a small-diameter portion 5*ib* at the tip end, a connecting medium-diameter portion 5*ic* with a larger diameter, and a connecting valve gradient portion 5*id*. The medium-diameter portion 5*ic* is sized to fit with the small-diameter portion 5*ha* of the valve seat cylinder 5*h* with a predetermined gap, and the valve gradient portion 5*id* is brought into contact from the small-diameter portion 5*ha* of the valve seat cylinder 5*h* to the step edge of the large-diameter portion 5*hb* so as to block communication of the hydraulic oil between both of them. A valve construction of this type is sometimes called a poppet type.

A through hole 5*ie* is provided in the disk portion 5*ia* to enable communication of hydraulic oil from the stepped projection side to the non-step projection side.

The non-step projection is formed as a rear-portion projection 5*if*. When the valve body 5*i* is moved to its maximum limit, the tip end of this rear-portion projection 5*if* fully opens the conical portion 4*e* of the valve body 4*d* in the check valve 4*b*. This allows the hydraulic oil to flow through this check valve 4*b*.

The valve body 5*i* is incorporated in the valve seat cylinder 5*h* so that the tip end of its small-diameter portion 5*ib* is brought into contact with the tip end of the small-diameter portion 5*ib* of the opposing switching valve 5A.

The operate check valve 4A provided with the above switching valve 5A operates as follows to perform the same functions and effects as the operate check valve 4 in FIG. 1.

The state shown in FIG. 2(*a*) is a stationary state of the pump 1. At this time, the switching valve 5A is in the neutral state as shown. The pair of check valves 4*b* is held closed, and the stationary state of the hydraulic actuator 2 is maintained.

When the hydraulic pump 1 is rotated to discharge hydraulic oil to the bottom-side port, the high-pressure hydraulic oil flows through the opening 5*hc* of the valve seat cylinder 5*h* on the bottom side, and through the through hole 5*ie* of the valve body 5*i* into the oil chamber between this valve body 5*i* and the check valve 4*b*. This opens the check valve 4*b* on the assembly's bottom side, and hydraulic oil is thus supplied to the bottom-side oil chamber 2*a* of the hydraulic cylinder 2.

At the same time, the valve body 5*i* of the bottom-side switching valve 5A is moved to the right (to the rod side), which moves the valve body 5*i* of the rod-side switching valve 5A to the rod side, which in turn opens the check valve 4*b* on the rod side of the assembly. Hydraulic oil from the rod-side oil chamber 2*b* of the hydraulic cylinder 2 flows through this check valve 4*b*, and from there through the through hole 5*ie* provided on the valve body 5*i* of the rod-side switching valve 5A and the opening 5*hc* of the valve seat cylinder 5*h* and into the hydraulic pump 1 so as to generate a driving force to drive the hydraulic cylinder 2 in the extending direction.

At this time, in the rod-side switching valve 5A, the oil chamber on the stepped projection side of the valve body 5*i* can communicate with the hydraulic oil in the tank 3 through the opening 5*hd* of the valve seat cylinder 5*h*. The shortage of hydraulic oil flowing out of the rod-side oil chamber 2*b* with respect to the bottom-side oil chamber 2*a* of the hydraulic cylinder 2 is compensated for by oil supplied from the tank 3.

When the hydraulic pump 1 is rotated to discharge the hydraulic oil to the rod-side port, on the other hand, the pair of check valves 4*b* of the operate check valve 4A and the switching valve 5A are operated reversely to the above so as to generate a driving force to the hydraulic cylinder 2 in the contracting direction, and the excess hydraulic oil at that time is returned to the tank 3, since the communication of hydraulic oil to the tank 3 is then made possible at the bottom-side switching valve 5A.

In either of the above driving directions, closure between the valve body 5*i* of the switching valve 5A and the valve seat cylinder 5*h* is provided by the poppet type valve, and the flow of hydraulic oil can be fully closed. Leakage between the bottom side as well as the rod side and the tank can be prevented as compared with the spool-type switching valve 5 shown in FIG. 1, and the pump efficiency can thereby be improved.

Also, a predetermined gap is provided between the outer diameter of the medium-diameter portion 5*ic* of the valve body 5*i* of the switching valve 5A and the small-diameter portion 5*ha* of the valve seat cylinder 5*h* so that, by throttling the hydraulic oil amount passing through both as appropriate, the oil pressure on the tank 3 side acts on the area of the medium-diameter portion 5*ic* only on the stepped projection side, and the force acting on the non-step side is relatively increased among the forces acting on both surfaces of the disk portion 5*ia* of the valve body 5*i* so that the pilot action is performed.

The hydraulic driving unit 10A' shown in FIG. 2(*b*) differs from the hydraulic driving unit 10A in FIG. 2(*b*), in that a projection for realizing contact between a check valve 4*b*' and a switching valve 5A' in an operate check valve 4' is located on the check valve side.

In the hydraulic driving unit 10A in FIG. 2(*a*), the check valve 4*b* is the same as the check valve 4*b* in the hydraulic driving unit 10 in FIG. 1. In the example shown in FIG. 2(*b*), the projection for mutual contact and influence between the check valve 4*b*' and the switching valve 5A' is provided on the check valve 4*b*' side. That is, a conical valve portion 4*e*' of a valve body 4*d*' constituting the check valve 4*b*' has at its tip end a projection 4*ea* that replaces the rear-portion projection 5*i* of the valve body 5*i* in the switching valve 5A of the hydraulic driving unit 10A shown in FIG. 2(*a*).

In correspondence, the disk portion 5*ia* of a valve body 5*i*' constituting the switching valve 5A' has nothing corresponding to the rear-portion projection 5*i*.

The same functions and effects are achieved in the hydraulic driving units shown in FIGS. 2(*a*) and 2(*b*).

The operate check valves 4A and 4A' described with reference to FIGS. 2(*a*) and 2(*b*) perform the above functions and effects as parts of their hydraulic driving units 10A and 10A', respectively, and they are used for controlling the flow of hydraulic oil in both the normal and reverse directions. Also, the above functions and effects of the operate check valve provided with the switching valve function are performed as well.

Also, the hydraulic driving units 10A and 10A' provided with those operate check valves 4A and 4A' perform those functions and effects as a unit.

The operate check valves 4A and 4' in these embodiments include switching valves that are integrated and formed into a poppet as compared with the other examples described above.

Figure 3A:
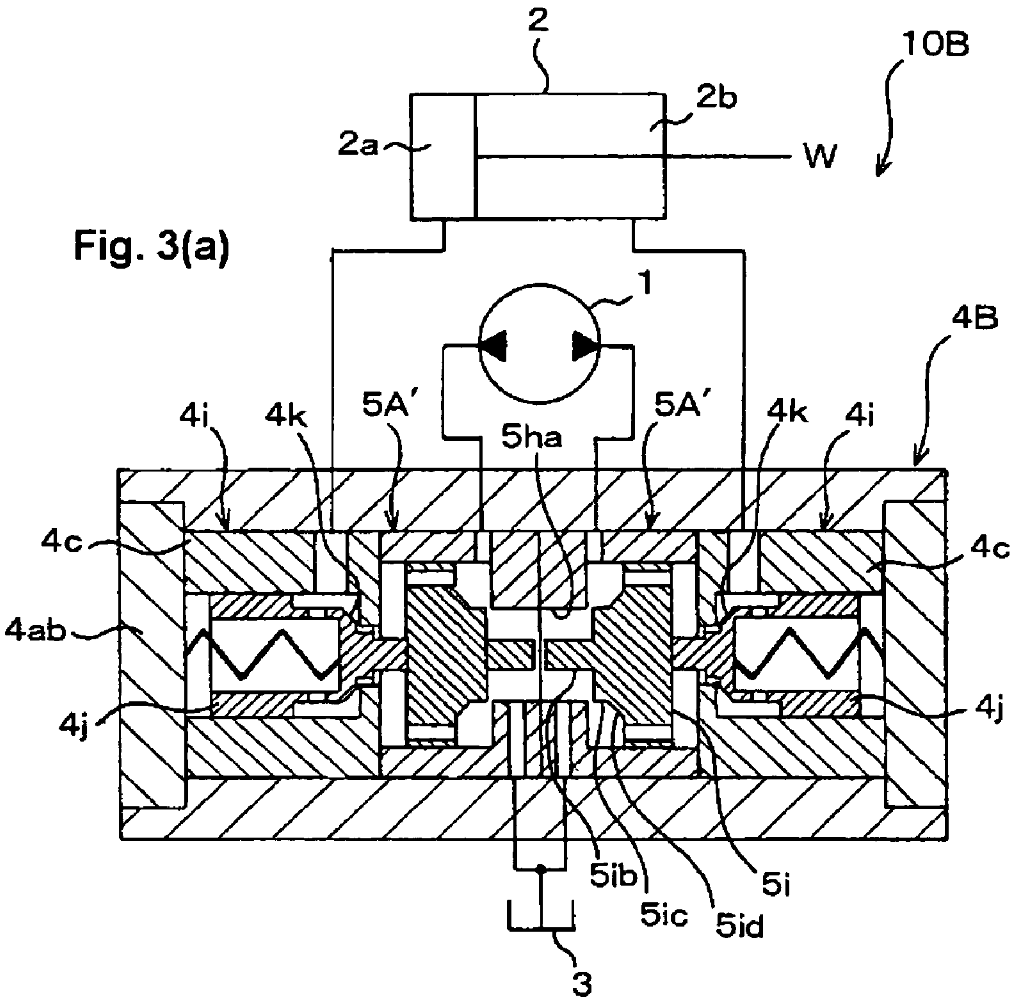
FIG. 3(*a*) illustrates another example of a hydraulic driving unit provided with an operate check valve according to the invention.
Figure 3B:
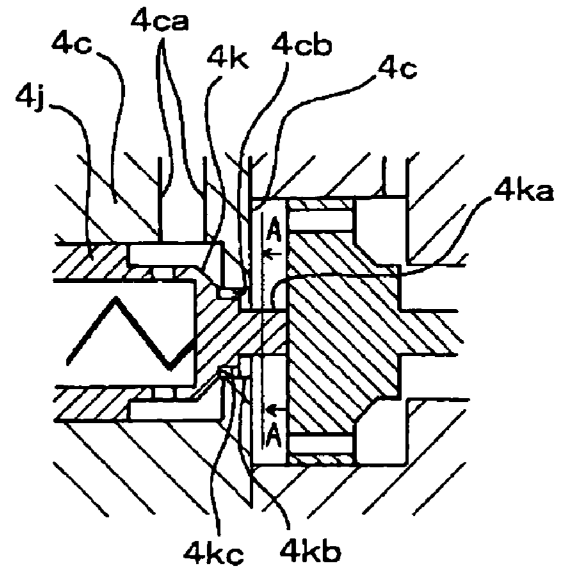
Figure 3C:
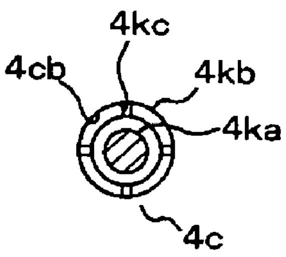

FIG. 3(*a*) is a conceptual diagram showing another embodiment of a hydraulic driving unit provided with an operate check valve according to the invention, FIG. 3(*b*) is a detailed view of an essential part of the embodiment shown in FIG. 3(*a*), and FIG. 3(*c*) is a sectional view on arrow AA of FIG. 3(*b*).

This hydraulic driving unit 10B differs from the hydraulic driving unit 10A' of FIG. 2(*b*) in that a pair of check valves 4*i* contained in an operate check valve 4B is also provided with a slow return valve function.

The check valve 4*i* is has a valve seat body 4*c* like that in the check valve 4*b*' of FIG. 2(*b*). This check valve 4*i* is different, though, in that its valve body 4*j* has a stepped profile with one step on the tip end side of a conical valve portion 4*k*.

A tip end projection 4*ka* of this stepped projection is retracted into the valve seat hole 4*cb* to fully open the valve 4*i* when it is pushed by the hydraulic oil discharged from the hydraulic pump 1 and the valve body 4*j* comes to the rearmost end (the rear end of the valve body 4*j* is brought into contact with the containing lid 4*ab*).

A stepped portion 4*kb* continuing to the tip end projection 4*ka* has an outer diameter that allows it to slide with respect to the inner diameter of the valve seat hole 4*cb* and to prevent communication of the hydraulic oil through the valve. The valve body's configuration at this location prevents the communication of hydraulic oil other than through a fixed throttle passage 4*kc* with respect to the valve seat hole 4*cb* to the degree the valve is opened by the pilot action of the switching valve 5A' from the fully closed position of the check valve 4*i*. The valve gradient portion 5*id* of the valve body 5*i* of the discharge-side switching valve 5A' closes the small-diameter portion 5*ha* of the valve seat cylinder 5*h*.

A fixed throttle passage 4*kc* is provided from the front end of the stepped portion 4*kb* to the front end of the conical gradient. The throttle passage 4*kc* has a depth that is determined by its outer circumference and selected so as to allow reverse flow of the hydraulic oil at a predetermined flow rate as the check valve 4*i* is opened by the pilot action.

The spatial sectional area of the groove in the fixed throttle passage 4*kc* is not changed in the axial direction of the valve body 4*j*.

When providing the fixed throttle on the valve body 4*j*, apart from providing the above fixed throttle passage 4*kc*, the outer diameter of the step portion (corresponding to 4*kb*) can be made smaller than the inner diameter of the valve seat hole 4*cb* of the valve seat body 4*c* so as to correspond to this passage area.

When the fixed throttle passage 4*kc* is incorporated in the check valve 4*i*, it allows inflow of the hydraulic oil from the hydraulic pump 1 to the hydraulic cylinder 2, and allows flow of the hydraulic oil from the hydraulic cylinder 2 to the hydraulic pump 1 only by the amount of this throttle passage 4*kc* by opening the check valve 4*i* by the pilot action at a predetermined opening degree when reverse flow of the hydraulic oil from the hydraulic cylinder 2 to the hydraulic pump 1 is allowed. It can also play a role of the slow return valve SR in FIG. 10, when FIG. 3 and FIG. 10 are compared as a whole.

In this way, the fixed-type slow return valve that has been provided separately in other embodiments can be provided with only a slight additional modification to provide the fixed throttle passage 4*kc* in the check valve 4*i*.

This fixed throttle passage 4*kc* can be additionally provided in the check valve 4*b* used in common in the operate check valve 4 constituting the hydraulic driving unit 10 in FIG. 1 and the operate check valve 4A constituting the hydraulic driving unit 10A in FIG. 2(*a*), and the same function is performed.

In the operate check valve 4B of this example, the switching valve is integrated and formed as a poppet and, moreover, the fixed-type slow return valve is also integrated when compared with the previous examples.

FIG. 4(*a*) is a conceptual diagram showing another embodiment of a hydraulic driving unit provided with an operate check valve according to the invention. FIG. 4(*b*) is a detailed view of a valve portion of the check valve shown in FIG. 4(*a*).

This hydraulic driving unit 10C is like the hydraulic driving unit 10B in FIG. 3(*a*) in that the pair of check valves 41 contained in an operate check valve 4C is provided with the slow return function, but different in that this check valve 4*l* is a variable type in which the throttle amount of the slow return can be changed, while the slow return function of the check valve 4*i* of the hydraulic driving unit 10B in FIG. 3(*a*) is a fixed type in which the throttle amount can not be changed.

This check valve 4*l* is different from the check valve 4*i* in FIG. 3(*a*) in that a valve seat body 4*m* is contained in a valve containing portion 4*a*', which is adjustable inwardly and outwardly, and in that a throttle gradient portion 4*oa* is provided at a valve portion 4*o* of a valve body 4*n*.

The switching valve 5 side portion of the valve seat body 4*m* is common to the valve seat body 4*c* of the check valve 4*i* in FIG. 3(*a*).

Disks 4*ma* are provided on opposite sides of the switching valve 5 portion of the valve seat body 4*m* for adjusting the position of the rear end of the spring 4*h*. A stop ring 4*mb* holds the disk 4*ma* in position, and a lid 4*mc* closes the rear opening of the valve seat body 4*m* in an oil tight manner. A male screw 4_md_ is formed on the outer circumference and a locknut 4_me_ is externally fitted to this male screw 4_md._

The valve containing portion 4_a_' does not include the same containing cylinder lid 4_ab_ as the valve containing portion 4_a_ in FIG. 1. Instead, a female screw 4_ac_ that corresponds to the male screw 4_md_ of the valve seat body 4_m_ is formed on the inside of both of the end openings of a containing cylinder 4_aa'._

The male screw 4_md_ of the valve seat body 4_m_ is thus fitted to the female screw 4_ac_ of the valve containing portion 4_a_', and thereby made adjustable to an optimal position. This position can be fixed by means of a locknut 4_me._

The throttle gradient portion 4_oa_ of the valve portion 4_o_ is sloped shallower than the conical gradient that closes the valve portion 4_o_. A projection 4_ob_ at its tip end is the same as the projection 4_ea_ provided at the valve portion 4_e_' of the valve body 4_d_ included in the check valve 4_b_' in FIG. 2(_b_).

With this construction, the operate check valve 4C provided with this check valve 4_l_ includes the slow return function. By adjusting the linear position of the valve seat body 4_m_ that contains the valve body 4_n_, the throttling location of the slow return in the throttle gradient portion 4_oa_ of the valve portion 4_o_ can be adjusted so that the throttle can be made variable.

Making the gradient of this throttle gradient portion 4_oa_ shallow allows for fine adjustment of the variable throttle. The variable throttle can be achieved with the gradient portion of variable radius as in this example, but it may also be achieved by means of a variable throttle passage in which the sectional area of the passage provided at a spool 5_b_" changes, as is the case in the embodiment illustrated in FIG. 7C.

The operate check valve 4C in this example includes a switching valve that is integrated and formed as a poppet. A variable-type slow return valve is also integrated in this example in comparison with other constructions described above.

FIGS. 5(_a_) and 5(_b_) are conceptual diagrams showing another embodiment of a hydraulic driving unit that is provided with an operate check valve according to the invention. FIG. 5(_c_) is a detailed view of a characteristic portion of a spool depicted in FIG. 5(_b_).

The hydraulic driving unit 10D shown in FIG. 5(_a_) is different from the hydraulic driving unit 10 in FIG. 1 in that a switching valve 5B contained in an operate check valve 4D performs the slow return valve function together with a check valve 4_i_. Check valves 4_i_ are disposed on either side of the switching valve 5B. These check valves 4_i_ are of the same construction and provide the same slow return function as the check valves included in the operate check valve 4B shown in FIG. 3.

The switching valve 5B included in the operate check valve 4D has the same basic structure as that of the switching valve 5 in FIG. 1. This switching valve 5B is different, though, in that a spool cylinder 5_a_' is, as compared with the spool cylinder 5_a_ of the switching valve 5 of FIG. 1, provided with a movement regulating means in the form of stops 5_j_ at the bottom side and the rod side of the valve. These movement regulating means halt the movement of the spool cylinder 5_a_ at a predetermined position at which the check valve 4_i_ is opened on the non-discharge side of the pump when the spool 5_b_ is pushed by the hydraulic oil discharged from the hydraulic pump 1.

This movement regulating means 5_j_ functions similarly to the pilot braking function of the valve gradient portion 5_id_ of the valve body 5_i_ that constitutes the poppet-type switching valves 5A' in FIG. 3(_a_), with the pilot function performed at a position where the throttle of the slow return of the throttle passage 4_kc_ of the check valve 4_i_ in FIGS. 3(_a_) and 3(_b_) is effective.

This operate check valve 4D thus provides the slow return valve function while using the same spool-type switching valve as the hydraulic driving unit 10 in FIG. 1.

A hydraulic driving unit 10D' shown in FIG. 5(_b_) is similar to the hydraulic driving unit 10D in FIG. 5(_a_) in that the slow return valve function is performed in an assembly that includes a spool-type switching valve 5B' in an operate check valve 4D'. This hydraulic driving unit 10D' is different, though, in that the slow return throttle is provided not on the check valve side but on the switching valve side.

The check valve 4_b_ is thus the same as the check valve 4_b_ used in the operate check valve 4 of the hydraulic driving unit 10 in FIG. 1, i.e., without the slow return valve function.

On the other hand, the spool cylinder 5_a_' in the switching valve 5B' is different from that of the switching valve 5B in the operate check valve 4D of FIG. 5(_a_), in that this spool cylinder does not include the movement regulating means 5_j_. The spool cylinder 5_a_' in switching valve 5B' is similar in this way to the spool cylinder 5_a_ of the switching valve 5 in the operate check valve 4 of FIG. 1.

The outer diameter of the outer shaft portion 5_k_ on each end of the spool 5_b_' is selected so that the outer shaft portion can slide into the inner diameter of the valve seat hole 4_cb_ of the check valve 4_b_ to block the flow of hydraulic oil. This spool, though, further includes a fixed throttle passage 5_ka_, of a size selected to provide the pilot function at the outer diameter of the spool ends.

As FIG. 5(_c_) illustrates, the size of the groove that defines the fixed throttle passage 5_ka_ is constant along the axial direction of the spool 5_b'._

A similar throttle passage can be provided by keeping the outer diameter of the spool end 5_k_ constant but somewhat smaller than the inner diameter of the valve seat hole 4_cb_ of the check valve 4_b_, thereby providing an effective throttle passage area through the valve.

It is also not necessary to provide the movement regulating means 5_j_ that is illustrated in FIG. 5(_a_) when the fixed throttle is provided on the switching valve side, because the fixed throttle in this case is present at all times while the pilot function is performed.

In the embodiment shown in FIG. 5(_a_), on the other hand, the fixed throttle is provided on the side of the check valve 4_i_. This check valve 4_i_ is required to be fully opened by the hydraulic oil discharged from the hydraulic pump 1. The tip end projection 4_ka_ is present at the tip end of the valve body 4_j_ of the check valve 4_i_. The tip end projection 4_ka_ thus corresponds to the fully open state of the valve. The stepped portion 4_kb_ that defines a throttle passage 4_kc_ that is always open through the valve.

Since the spool 5_b_ needs to open the valve body 4_j_ of the check valve 4_i_ to a position at which the throttle passage 4_kc_ corresponding to the pilot open becomes effective, the movement regulating means 5_j_ is therefore required.

In this embodiment, as with the operate check valve 4D in FIG. 5(_a_), the slow return valve function can be provided in an assembly that uses a spool-type switching valve.

The operate check valves 4D and 4D' in these embodiments include integrated switching valves in combination with fixed-type slow return valves, in contrast to some of the embodiments described previously in this document.

Figure 6A:
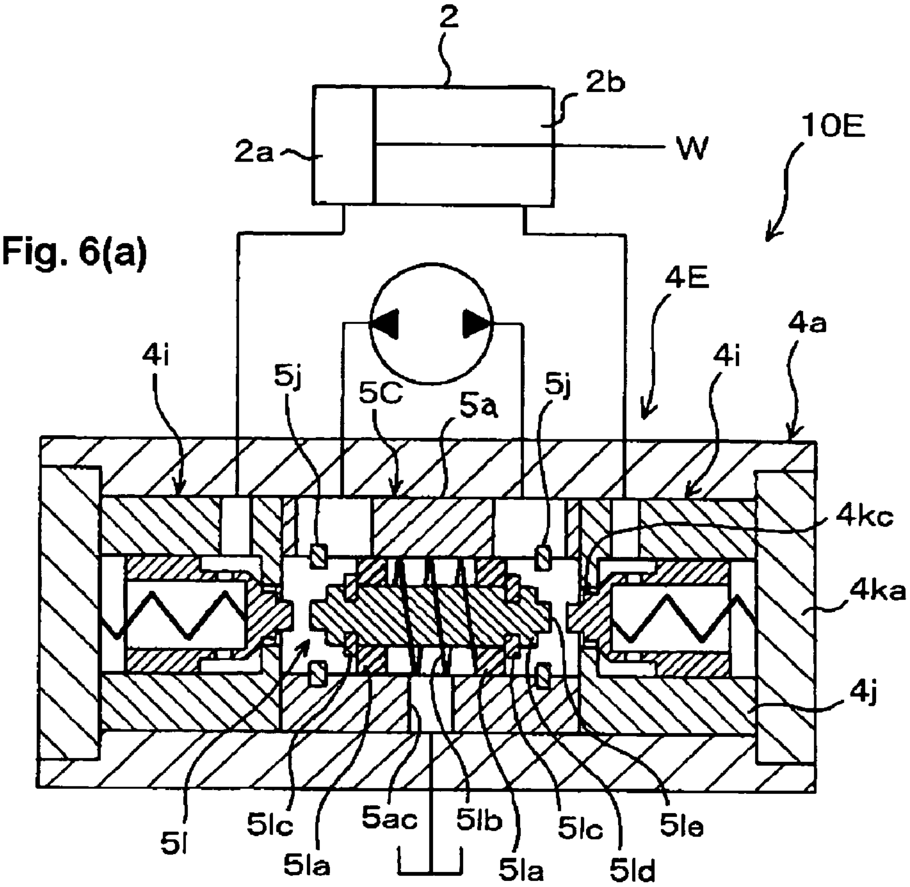
FIGS. 6(*a*) and 6(*b*) are conceptual diagrams showing other examples of hydraulic driving units provided with operate check valves according to the invention.
Figure 6B:
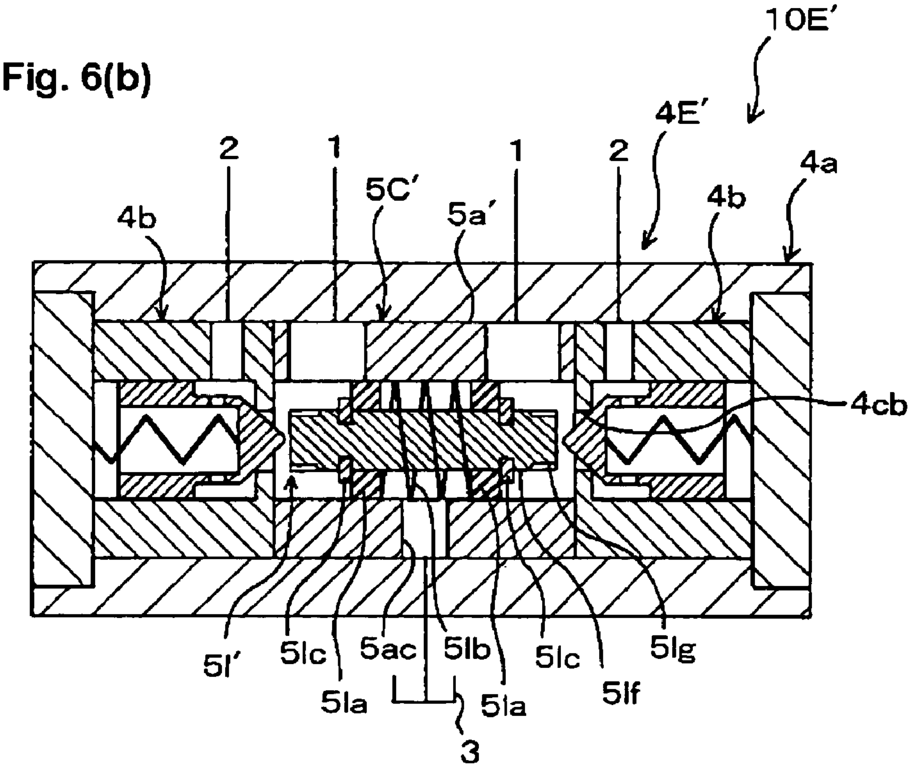

FIGS. 6(_a_) and 6(_b_) are conceptual diagrams showing another embodiment of a hydraulic driving unit that includes an operate check valve according to the invention.

The hydraulic driving unit 10E shown in FIG. 6(*a*) is different from the hydraulic driving unit 10D in FIGS. 5(*a*) and 5(*b*) in that a switching valve 5C contained in an operate check valve 4E includes and performs the function of an integrated relief valve.

The spool cylinder 5*a* of the switching valve 5C inside the operate check valve 4E is the same as the spool cylinder 5*a*' of the switching valve 5B in FIG. 5(*a*), including the movement regulating means in the form of the stops 5*j*.

This embodiment includes a spool 5*l* with a relief valve function. This spool 5*l* is provided with two cylindrical plates 5*la*, a spring 5*lb* held between these cylindrical plates 5*la* for urging the cylindrical plates 5*la* apart from each other, a stop ring 5*lc* for limiting the degree to which the cylindrical plates 5*la* can move apart, and a through shaft 5*ld* that extends through the cylindrical plates 5*la*, the spring 5*lb*, and the stop rings 5*lc*.

The outer diameter of the cylindrical plate 5*la* allows the plate to slide inside the inner diameter of the spool cylinder 5*a*', and the inner diameter of the cylindrical plate 5*la* is such that it can slide over the outer diameter of the through shaft 5*ld*. The spring 5*lb* fits between the two cylindrical plates 5*la* around the through shaft 5*ld*. The stop rings 5*lc* are fitted in grooves provided at predetermined positions on the through shaft 5*ld* to limit the maximum extent to which the cylindrical plates 5*la* can move apart from one another under the urging of the spring 5*lb*.

Each end of the through shaft 5*ld* has a projection 5*le*, which contacts the tip end projection 4*ka* of the valve body 4*j* that forms the opposing check valve 4*i*. Contact between the tip end projection 4*ka* and the valve body 4*j* pushes valve body 4*j* open to allow the hydraulic oil to flow through the valve.

When both of the two cylindrical plates 5*la* are urged by the spring 5*lb* against the stop rings 5*lc*, the plates 5*la* have the same positional relationship as the two disk portions 5*bb* of the spool 5*b* of the switching valve 5B in FIG. 5(*a*) (which is the same as that shown in FIG. 1), and the spool thus performs the same function. The switching valve 5C provided with this spool 5*l* normally performs the same functions and has the same effects as the switching valve 5B in FIG. 5(*a*). This configuration also includes the slow return function, with motion of the spool limited by the presence of movement regulating means in the form of stops 5*j*.

While the hydraulic pump 1 is in operation a pressure higher than a predetermined maximum may for some reason occur in the discharge-side oil chamber of the two oil chambers that are separated by the spool 5*l*. Such an overpressure will urge the cylindrical plate 5*la* on the discharge side against the urging force of the spring 5*lb* in the direction opposite to the discharge side. This opens a passage through the opening 5*ac* to the tank 3, and the high pressure hydraulic oil is thus dumped back to the tank 3, thereby relieving the over-pressure condition on the discharge side of the pump.

The function of the relief valve RV2 of the hydraulic driving unit OU in FIG. 10 is therefore performed by the spool 5*l* in this embodiment, and the relief valve RV2 is thus absorbed and integrated into the operate check valve 4E.

A hydraulic driving unit 10E' shown in FIG. 6(*b*) is like the hydraulic driving unit 10E in FIG. 6(*a*) in that a switching valve 5C' contained in an operate check valve 4E' absorbs and integrates the relief valve functions. The hydraulic driving unit 10E' is different, though, in that the throttle of the slow return is provided not on the check valve side but on the switching valve side.

That is, in the hydraulic driving unit 10E in FIG. 6(*a*), the valve body 4*j* of the check valve 4*i* in the operate check valve 4E is provided with the fixed throttle passage 4*kc*, but in the hydraulic driving unit 10E' of FIG. 6(*b*), the check valve 4*b* in the operate check valve 4E' is not provided with the slow return throttle.

Instead, and similar to the switching valve 5B' in FIG. 5(*b*), the outer diameter of a through shaft 5*lf* of a spool 5*l*' of the switching valve 5C' is selected so that it can slide into the inner diameter of the valve seat hole 4*cb* of the check valve 4*b* to block passage of the hydraulic oil. This spool 5*l*' is different form the spool 5*l* in that a fixed throttle passage 5*lg* is provided on both ends of the through shaft 5*lf* at a location that allows the pilot function to be performed.

In this embodiment, too, the relief valve function is incorporated, as is true of the operate check valve 4E in FIG. 6(*a*).

The operate check valves 4E and 4E' in these examples include integrated switching valves and a fixed-type slow return valve, in combination with a relief valve that is also included and integrated in contrast to the embodiments described in the prior examples.

Figure 7A:
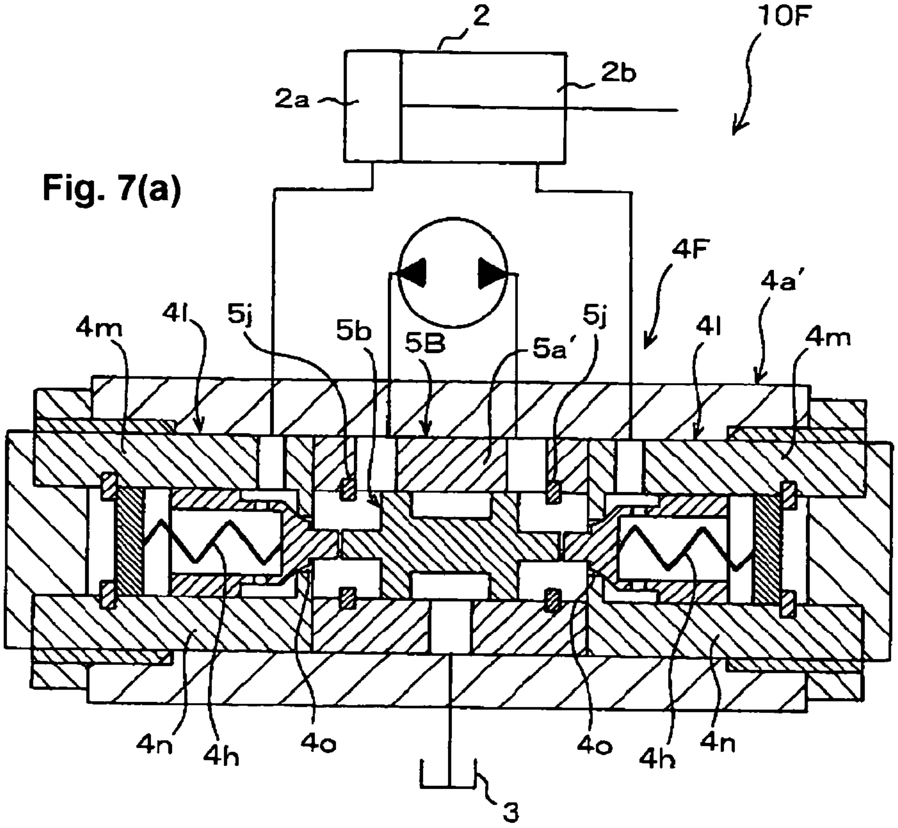
FIGS. 7(*a*) and 7(*b*) are conceptual diagrams showing further examples of hydraulic driving units provided with operate check valves according to the invention.
Figure 7B:
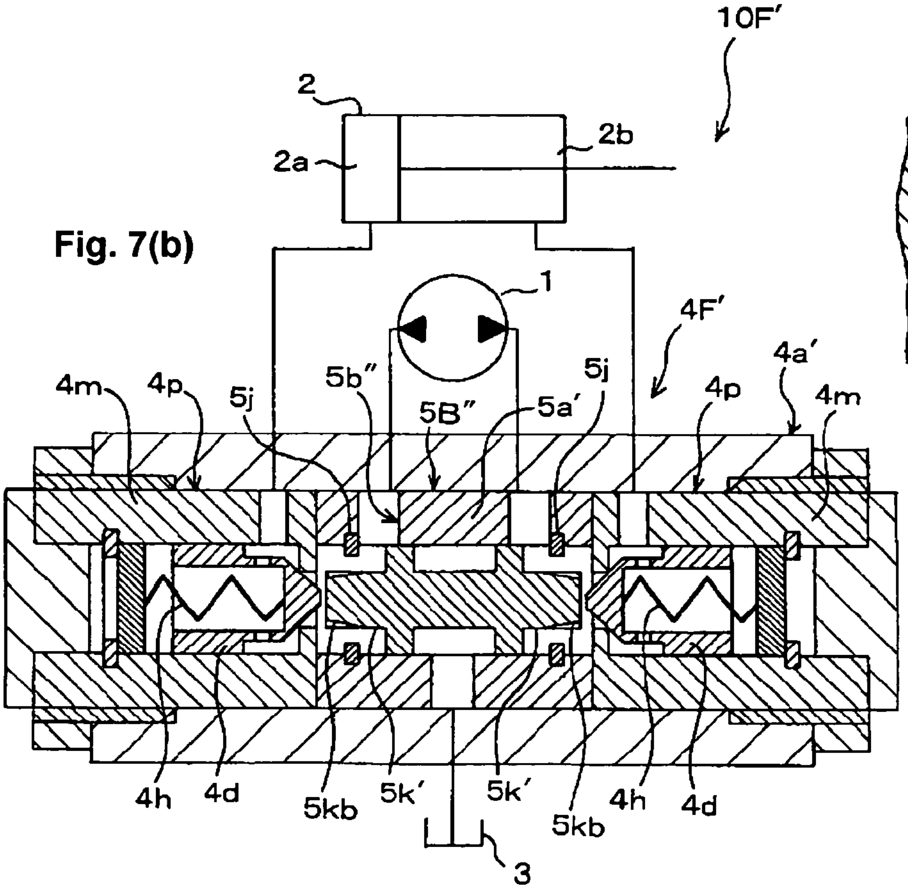
Figure 7C:
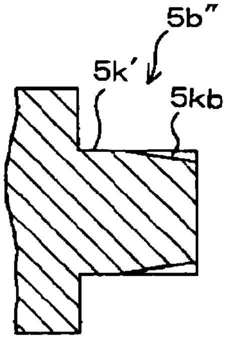

FIGS. 7(*a*) and 7(*b*) are conceptual diagrams showing further embodiments of hydraulic driving units that include operate check valves according to the invention. FIG. 7(*c*) is a detailed view of a part of a spool that forms a part of the assembly shown in FIG. 7(*b*).

The hydraulic driving unit 10F shown in FIG. 7(*a*) differs from the hydraulic driving unit 10 in FIG. 1 in that this unit integrates an operate check valve 4F as well as a variable slow return valve. This embodiment is similar in that respect to the embodiment shown in FIGS. 4(*a*) and 4(*b*).

In FIG. 4(*a*), the switching valve 5A' is of the poppet type. In this unit 10F, on the other hand, the switching valve 5B is of the spool type like that shown in FIG. 1. This unit 10F, though, exchanges the fixed-type slow return valve in unit 10D in FIG. 5(*a*) for a variable-type slow return valve.

The check valve 4*l* and the valve containing portion 4*a*' in this operate check valve 4F are the same as the check valve 4*l* and valve containing portion 4*a*' in FIG. 4(*a*). The switching valve 5B is the same as the switching valve 5B in FIG. 5(*a*).

The operate check valve 4F in FIG. 7(*a*) thus performs the functions and combines the effects of the switching valve 5B and the check valve 4*l*. In other words, the switching valve is absorbed and integrated with the operate check valve, and the functions and effects of the variable-type slow return valve are also performed in this assembly.

A hydraulic driving unit 10F' shown in FIG. 7(*b*) is like the hydraulic driving unit 10F in FIG. 7(*a*) in that the operate check valve 4F' includes a variable-type slow return valve. The unit of FIG. 7(*b*) is different, though, in that the variable throttle of the slow return is provided not on the check valve side, but instead on the side of the switching valve 5B".

More specifically, the spool 5*b*" in the switching valve 5B" is provided with a variable throttle passage 5*kb*, while a check valve 4*p* has the same valve seat body 4*m* as the valve seat body 4*m* of the check valve 4*l* in FIG. 7(*a*). The valve seat body 4*m* is movable axially into and out of the valve containing portion 4*a*'. The valve body 4*d* in FIG. 7(*b*) is like that of the check valve 4*b* in FIG. 1.

The overall form of the spool 5*b*" of a switching valve 5B" is like that of the switching valve 5B' that includes the fixed throttle in unit shown in FIG. 5(*b*), but different in that a variable throttle passage 5*kb* is provided, with a variable sectional area that in the axial direction of the spool 5*b*", in place of the fixed throttle passage 5*ka* that is provided at the outer shaft portion 5*k*' as shown in FIG. 5(*c*).

By making the change amount of this variable throttle passage 5*kb* shallower, the variable throttle can be adjusted more finely. The variable throttle can be provided by the variable throttle passage as in this example, but it may also be provided in the form of a variable throttle that uses a conical throttle gradient portion 4*oa* at the tip end of the valve body 4*n* of the check valve 4*l*, as is shown in FIGS. 4(*a*) and 4(*b*).

The spool cylinder 5*a*' of the switching valve 5B" is like the spool cylinder 5*a*' of the switching valve 5B in FIG. 7(*a*), and is provided with the same type of movement regulating means in the form of a stop 5*j*, even though the slow return throttle is provided on the spool side.

The movement regulating means is required in this variable slow return valve, even though the variable throttle is provided on the pilot portion side and the switching valve side. This is because the provision of the check valve whose position is capable of axial adjusting does not make sense if the pilot operation range of the pilot portion and the switching valve operated oppositely to the check valve is not kept within a certain range.

In this embodiment, too, the variable slow return valve function can be provided in a manner similar to that of the operate check valve 4F in FIG. 7(*a*)

The operate check valves 4F and 4F' in these examples include switching valves that are integrated, as well as an integrated variable-type slow return valve.

Figure 8A:
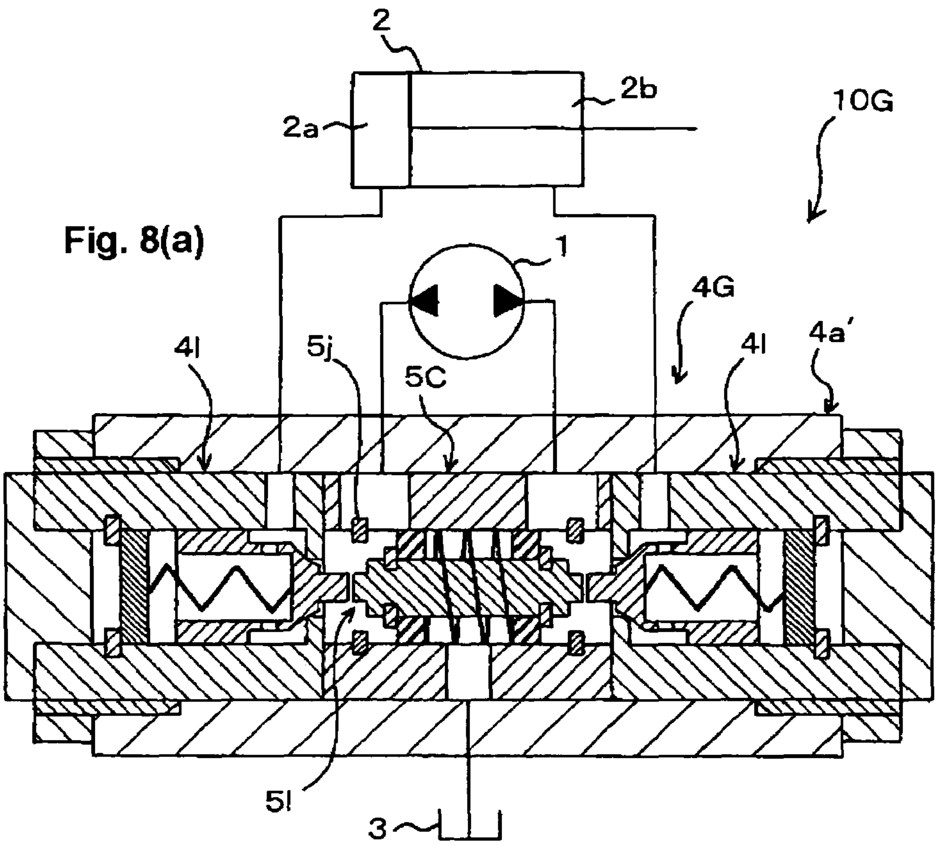
FIGS. 8(*a*) and 8(*b*) are conceptual diagrams showing further examples of hydraulic driving units that include operate check valves according to the present invention.
Figure 8B:
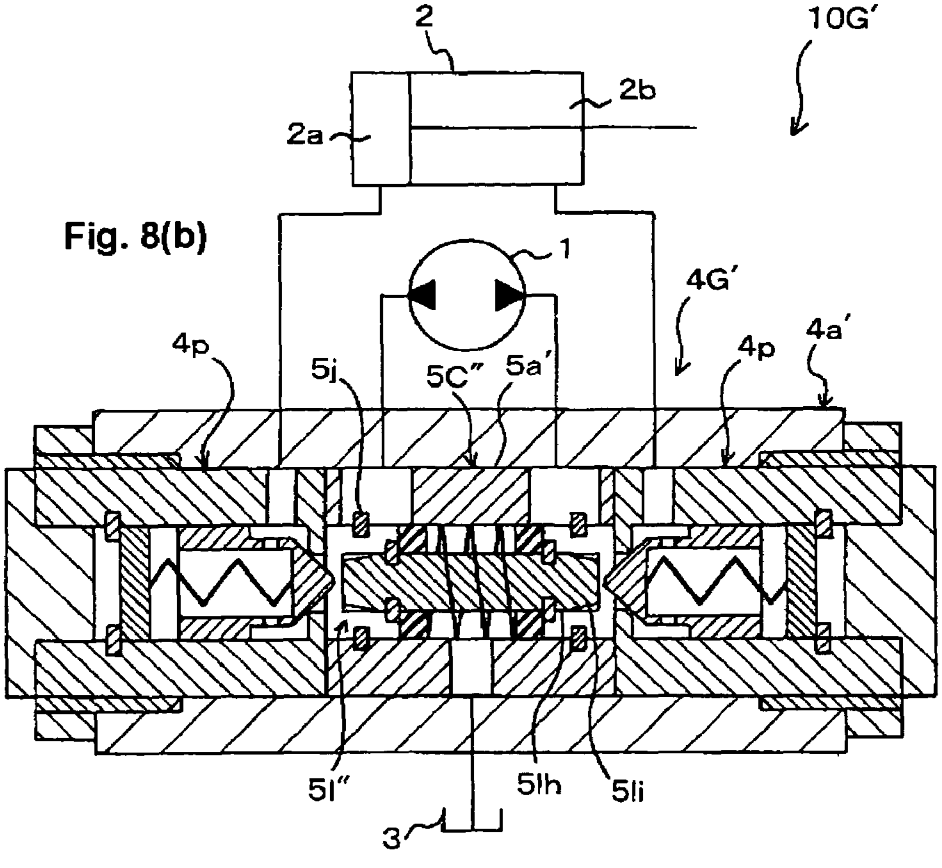

FIGS. 8(*a*) and 8(*b*) are conceptual diagrams showing further examples of hydraulic driving units that include operate check valves according to the invention.

Hydraulic driving units 10G and 10G', which are shown in FIGS. 8(*a*) and 8(*b*), are like the hydraulic driving units 10F and 10F' of FIGS. 7(*a*) and 7(*b*) in that the switching valves 5C and 5C" in the operate check valves 4G and 4G' integrate variable-type slow return valves. They are different, though, in that the relief valve is also integrated as was the case with the units in FIGS. 6(*a*) and 6(*b*).

More particularly, the switching valves 5C and 5C" of FIGS. 8(*a*) and 8(*b*) are basically the same as the switching valves 5B and 5B" in FIGS. 7(*a*) and 7(*b*), with the addition of integrated relief valves in the units shown in FIGS. 8(*a*) and 8(*b*).

The switching valve 5C in FIG. 8(*a*), in which the variable throttle is provided on the check valve 4*l* side, is like the switching valve 5C in FIG. 6(*c*).

The unit shown in FIG. 8(*b*), in which the variable throttle is provided on the side of the switching valve 5C", is different from the unit that includes the switching valve 5C' shown in FIG. 6(*b*). In FIG. 8(*b*) the spool cylinder 5*a*' is provided with movement regulating means in the form of steps 5*j*, and the spool 5*l*" includes a variable throttle passage 5*li* on both ends of its through shaft 5*lh*, at a location that provides a pilot function to the valve.

The shape of the variable throttle and the need for the movement regulating means when the variable throttle is provided on the switching valve side are as explained above in connection with FIG. 7(*b*).

The assemblies shown in FIGS. 8(*a*) and 8(*b*) combine the functions and effects of the switching valves 5C and 5C', the check valves 4*l* and 4*p*, variable slow return valves, and relief valves in single integrated check valve assemblies 4G and 4G'.

The difference between the hydraulic driving units 10G and 10G' is whether slow return throttle is provided on the check valve side as in FIG. 8(*a*), or the switching valve side as in FIG. 8(*b*).

Figure 9:
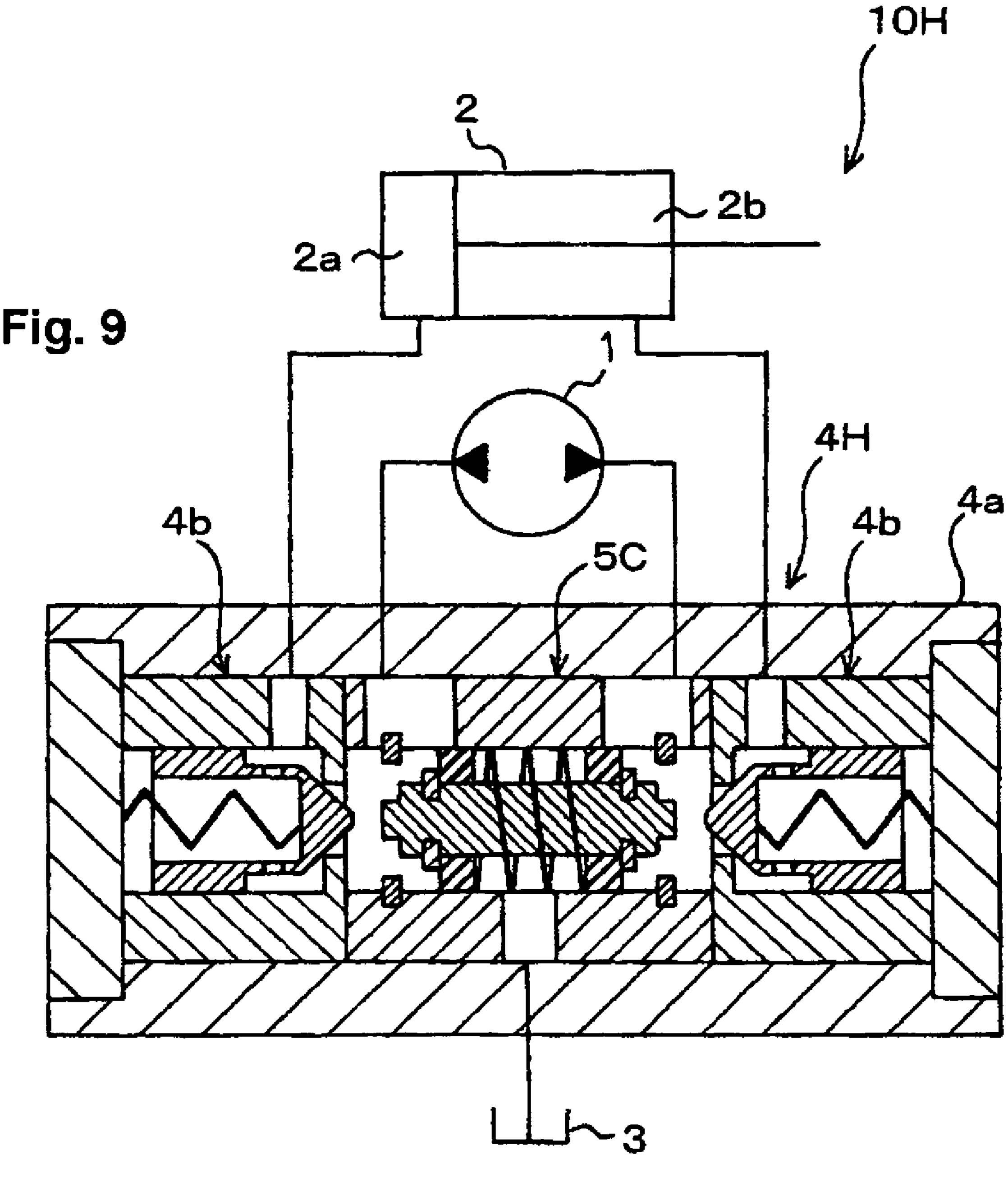
FIG. 9 is a conceptual diagram showing another example of a hydraulic driving unit provided with an operate check valve according to the present invention.

FIG. 9 is a conceptual diagram showing another example of a hydraulic driving unit provided with an operate check valve according to the invention.

This hydraulic driving unit 10H is different from the hydraulic driving unit 10 in FIG. 1 in that an operate check valve 4H integrates a relief valve of the type shown in FIG. 6(*a*).

More specifically, the switching valve 5C in the operate check valve 4H integrates a relief valve of the type shown in FIG. 6(*a*).

This assembly thus provides a hydraulic driving unit according to the invention, in which an operate check valve 4H performs the functions of both a switching valve 5C and a check valve 4*b*, in combination with a relief valve.

The examples described above combine and integrate in various ways the switching valve with an operate check valve. In some cases the switching valve is in the form of a poppet, in others in the form of a spool. Some embodiments include a fixed-type or a variable-type slow return valve, and some a relief valve. The possible combinations are not limited strictly to those described specifically above. Other combinations are possible within the principles of the invention.

The invention includes, moreover, not only operate check valves as have been described in the specific examples above, but also hydraulic drive units in which those valves may find use.

An operate check valve according to the present invention can be interposed between a hydraulic pump for pumping a hydraulic fluid in normal and reverse directions and a hydraulic actuator operated by this hydraulic fluid. The invention can be used in any industrial field where control of flow of a hydraulic fluid in both normal and reverse directions is needed, and space saving and multiple functions are desired.

What is claimed is:

1. An operate check valve comprising:

a switching valve having first and second valving regions and a central valving region located between said first and second valving regions;

a first check valve movable between closed and open configurations; and a second check valve movable between closed and open configurations;

wherein said switching valve is operable in a first configuration in which a first side fluid conduit of said switching valve is in fluid communication through the first valving region with a first check valve fluid conduit through the open first check valve, and a second side fluid conduit of said switching valve is in fluid communication with a central fluid conduit of said switching valve through the switching valve's central valving region;

wherein said switching valve is operable in a second configuration in which the second side fluid conduit of said switching valve is in fluid communication through the second valving region with a second check valve fluid conduit through the open second check valve, and the first side fluid conduit of said switching valve is in fluid communication with the central fluid conduit of said switching valve through the switching valve's central valving region; and wherein structure on the switching valve is configured to bear on structure of the first and second check valves to urge the first and second check valves from their closed to open configurations.

2. The operate check valve of claim 1, wherein said switching valve includes two outer members with a first relatively large cross-section separated by at least one central member having a second relatively small cross-section that is smaller than the relatively large cross-section of the two outer members, wherein the central valving region is defined between the two outer members, wherein the first valving region is defined on a side of one of the two outer members opposite the central valving region, and wherein the second valving region is defined on a side of the other of the two outer members opposite the second valving region.

3. The operate check valve of claim 2, wherein the at least one central member is a single structural member that joins the two outer members together.

4. The operate check valve of claim 2, wherein each of the two outer members has a circular cross-section fitted inside a bore with a corresponding circular cross-section.

5. A hydraulic drive assembly comprising:

a hydraulic pump operable to pump fluid in first and second directions, wherein when pumping in the first direction fluid is pumped from a first side of said pump, and wherein when pumping in the second direction fluid is pumped from a second side of said pump;

a hydraulic actuator configured to receive fluid at first and second sides of said actuator;

a tank configured to store a supply of the fluid; and an operate check valve comprising:

a switching valve having first and second valving regions and a central valving region located between said first and second valving regions;

a first check valve movable between closed and open configurations; and a second check valve movable between closed and open configurations;

wherein said switching valve is operable in a first configuration in which the first side of said pump and the first side of said hydraulic actuator are in fluid communication through the switching valve's first valving region, and the second side of said pump and said tank are in fluid communication through the switching valve's central valving region; and wherein said switching valve is operable in a second configuration in which the second side of said pump and the second side of said hydraulic actuator are in fluid communication through the switching valve's second valving region, and the first side of said pump and said tank are in fluid communication through the switching valve's central valving region; and wherein structure on the switching valve is configured to bear on structure of the first and second check valves to urge the first and second check valves from their closed to open configurations.

6. The hydraulic drive assembly of claim 5, wherein said switching valve includes two outer members with a first relatively large cross-section separated by at least one central member having a second relatively small cross-section that is smaller than the relatively large cross-section of the two outer members, wherein the central valving region is defined between the two outer members, wherein the first valving region is defined on a side of one of the two outer members opposite the central valving region, and wherein the second valving region is defined on a side of the other of the two outer members opposite the second valving region.

7. The hydraulic drive assembly of claim 6, wherein the at least one central member is a single structural member that joins the two outer members together.

8. The hydraulic drive assembly of claim 6, wherein each of the two outer members has a circular cross-section fitted inside a bore with a corresponding circular cross-section.

* * * * *